United States Patent
Fujimoto

(10) Patent No.: US 11,082,626 B2
(45) Date of Patent: Aug. 3, 2021

(54) IMAGE PROCESSING DEVICE, IMAGING DEVICE, AND IMAGE PROCESSING METHOD

(71) Applicant: SONY SEMICONDUCTOR SOLUTIONS CORPORATION, Kanagawa (JP)

(72) Inventor: Masakatsu Fujimoto, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 0 days.

(21) Appl. No.: 16/609,614

(22) PCT Filed: Feb. 21, 2018

(86) PCT No.: PCT/JP2018/006153
§ 371 (c)(1),
(2) Date: Oct. 30, 2019

(87) PCT Pub. No.: WO2018/230045
PCT Pub. Date: Dec. 20, 2018

(65) Prior Publication Data
US 2020/0112666 A1  Apr. 9, 2020

(30) Foreign Application Priority Data

Jun. 12, 2017 (JP) .............................. JP2017-114839

(51) Int. Cl.
*H04N 5/235* (2006.01)
*H04N 5/243* (2006.01)

(52) U.S. Cl.
CPC ......... *H04N 5/2355* (2013.01); *H04N 5/2351* (2013.01); *H04N 5/243* (2013.01)

(58) Field of Classification Search
CPC .... H04N 5/2355; H04N 5/2351; H04N 5/243; H04N 5/2357; G06K 9/4604; G06K 9/4661; G06K 9/209; G06T 5/50
See application file for complete search history.

(56) References Cited

U.S. PATENT DOCUMENTS

2014/0375848 A1* 12/2014 Yamamoto ........... H04N 5/2353
348/241
2019/0335079 A1* 10/2019 Koizumi ............ H04N 5/35572
(Continued)

FOREIGN PATENT DOCUMENTS

JP   05-064075 A    3/1993
JP   2011-234318 A  11/2011
(Continued)

OTHER PUBLICATIONS

International Search Report and Written Opinion of PCT Application No. PCT/JP2018/006153, dated May 1, 2018, 07 pages of ISRWO.

*Primary Examiner* — Shahbaz Nazrul
(74) *Attorney, Agent, or Firm* — Chip Law Group

(57) ABSTRACT

The present technology improves the image quality of a synthesized image in a device that synthesizes a plurality of images. Disclosed is an image processing device that includes a detection section, a synthesis ratio generation section, and a synthesis section. The detection section detects whether a light source has blinked during an exposure period of a detection target image among a plurality of images captured in chronological order, and outputs a detection result. In a case where the detection result indicates that the light source has blinked, the synthesis ratio generation section generates a synthesis ratio for making the percentage of the detection target image lower than the percentage of an image other than the detection target images. The synthesis (Continued)

section synthesizes the plurality of images at the synthesis ratio.

12 Claims, 28 Drawing Sheets

(56) References Cited

U.S. PATENT DOCUMENTS

2020/0169958 A1* 5/2020 Lee .................... H04W 52/146
2020/0314369 A1* 10/2020 Yamanaka ............. H04N 5/353

FOREIGN PATENT DOCUMENTS

| JP | 2016-146592 A | 8/2016 |
| WO | 2016/129405 A1 | 8/2016 |

* cited by examiner

IMAGE PROCESSING DEVICE, IMAGING DEVICE, AND IMAGE PROCESSING METHOD

CROSS REFERENCE TO RELATED APPLICATIONS

This application is a U.S. National Phase of International Patent Application No. PCT/JP2018/006153 filed on Feb. 21, 2018, which claims priority benefit of Japanese Patent Application No. JP 2017-114839 filed in the Japan Patent Office on Jun. 12, 2017. Each of the above-referenced applications is hereby incorporated herein by reference in its entirety.

TECHNICAL FIELD

The present technology relates to an image processing device, an imaging device, an image processing method, and a program for causing a computer to execute the image processing method. More specifically, the present technology relates to an image processing device for synthesizing a plurality of images, an imaging device, an image processing method, and a program for causing a computer to execute the image processing method.

BACKGROUND ART

In the past, a synthesis process has been performed in an imaging device to synthesize a plurality of image data (hereinafter simply referred to as "images") for the purpose of reducing noise and increasing a dynamic range. For example, proposed is an imaging device that synthesizes two images that differ in exposure time (refer, for example, to PTL 1).

CITATION LIST

Patent Literature

[PTL 1]
JP Hei 5-64075 A

SUMMARY

Technical Problem

The above-mentioned conventional technology enables the dynamic range to be increased by synthesis, but may degrade image quality in a case where an LED (Light Emitting Diode) or other light source blinking on a periodic basis is imaged. For example, when a synthesized image is obtained by imaging an LED or other light source blinking, the obtained synthesized image may include an image of black streaks that are nonexistent in reality. Such an image of an object that is nonexistent in reality is called a faulty image or an artifact. The faulty image may arise if, for example, the light source turns off during exposure of a certain line and a resulting dark line is subjected to synthesis in a case where a plurality of lines is sequentially exposed by a rolling shutter method. As described above, when a blinking light source is imaged, there arises a problem of degradation of synthesized image quality.

The present technology has been made in view of the above circumstances. An object of the present technology is to improve the image quality of a synthesized image in a device for synthesizing a plurality of images.

Solution to Problem

The present technology has been made to solve the above problem. According to a first aspect of the present technology, there are provided an image processing device, an image processing method, and a program for causing a computer to execute the image processing method. The image processing device includes a detection section, a synthesis ratio generation section, and a synthesis section. The detection section detects whether a light source has blinked during an exposure period of a detection target image among a plurality of images captured in chronological order, and outputs a detection result. In a case where the detection result indicates that the light source has blinked, the synthesis ratio generation section generates a synthesis ratio for making the percentage of the detection target image lower than the percentage of an image other than the detection target image. The synthesis section synthesizes the plurality of images at the synthesis ratio. Consequently, in a case where a light source blinks, it is possible to synthesize a plurality of images at a synthesis ratio for making the percentage of a detection target image lower than the percentage of an image other than the detection target image.

Further, in the first aspect, the image processing device may additionally include a determination section that determines whether a brightness change is present between the plurality of images, and outputs a determination result. The synthesis ratio generation section may generate the synthesis ratio on the basis of the determination result and the detection result. Consequently, it is possible to synthesize a plurality of images at a synthesis ratio that is generated on the basis of the detection result and the determination result indicative of the presence of a brightness change.

Further, in the first aspect, the synthesis ratio generation section may include a synthesis ratio calculation section, a synthesis ratio modulation section, and a synthesis ratio correction section. The synthesis ratio calculation section calculates a predetermined synthesis ratio. The synthesis ratio modulation section modulates the calculated synthesis ratio in accordance with the determination result. In a case where the detection result indicates that the light source has blinked, the synthesis ratio correction section corrects the modulated synthesis ratio so as to make the percentage of the detection target images lower than the percentage of the images other than the detection target images. The synthesis section may synthesize the plurality of images at the corrected synthesis ratio. Consequently, it is possible to synthesize a plurality of images at a corrected and modulated synthesis ratio.

Further, in the first aspect, the image processing device may additionally include a low-pass filter for each of the plurality of images. The low-pass filter passes low-frequency components having a frequency lower than a predetermined frequency. The determination section may determine on the basis of the low-frequency components whether the brightness change is present. Consequently, whether a brightness change is present can be determined on the basis of low-frequency components.

Further, in the first aspect, the synthesis ratio correction section may correct the synthesis ratio by using a subtractor. Consequently, it is possible to synthesize a plurality of images at a synthesis ratio corrected by a subtractor.

Further, in the first aspect, the synthesis ratio correction section may correct the synthesis ratio by using a multiplier.

Consequently, it is possible to synthesize a plurality of images at a synthesis ratio corrected by a multiplier.

Further, in the first aspect, the plurality of images may each include a predetermined number of lines that differ from each other in exposure start timing, and the detection section may detect presence of edges along the lines as presence of blinking of the light source. Consequently, it is possible to detect the presence of the edges along the lines as the presence of the blinking of the light source.

Further, in the first aspect, the detection section may detect the presence of the above edges by using a high-pass filter that passes high-frequency components having a frequency higher than a predetermined frequency. Consequently, it is possible to detect the presence of the edges in accordance with high-frequency components.

Further, in the first aspect, the plurality of images may include a first image, a second image, and a third image. The detection section may include an early-stage detection section and a late-stage detection section. The early-stage detection section detects whether the light source has blinked during the exposure period of the second image, and outputs the result of detection as an early-stage detection result. The late-stage detection section detects whether the light source has blinked during the exposure period of the third image, and outputs the result of detection as a late-stage detection result. The synthesis ratio generation section may include an early-stage synthesis ratio generation section and a late-stage synthesis ratio generation section. In a case where the early-stage detection result indicates that the light source has blinked, the early-stage synthesis ratio generation section generates a synthesis ratio for making the percentage of the second image lower than the percentage of the first image, as an early-stage synthesis ratio. In a case where the late-stage detection result indicates that the light source has blinked, the late-stage synthesis ratio generation section generates a synthesis ratio for making the percentage of the third image lower than the percentage of an early-stage synthesized image, as a late-stage synthesis ratio. The early-stage synthesized image is obtained by synthesizing the first image and the second image. The synthesis section may include an early-stage synthesis section and a late-stage synthesis section. The early-stage synthesis section synthesizes the first image and the second image at the early-stage synthesis ratio, and outputs the synthesized image as the early-stage synthesized image. The late-stage synthesis section synthesizes the early-stage synthesized image and the third image at the late-stage synthesis ratio. Consequently, it is possible to synthesize the first image and the second image and synthesize the early-stage synthesized image and the third image.

Further, in the first aspect, the image processing device may additionally include an early-stage determination section and a late-stage determination section. The early-stage determination section determines whether a brightness change is present between the first image and the second image, and outputs the result of determination as an early-stage determination result. The late-stage determination section determines whether a brightness change is present between the early-stage synthesized image and the third image, and outputs the result of determination as a late-stage determination result. The early-stage synthesis ratio generation section may generate the early-stage synthesis ratio in accordance with the early-stage determination result and the early-stage detection result. The late-stage synthesis ratio generation section may generate the late-stage synthesis ratio in accordance with the late-stage determination result and the late-stage detection result. Consequently, it is possible to synthesize the first image and the second image at the early-stage synthesis ratio generated on the basis of the early-stage determination result and the early-stage detection result, and synthesize the early-stage synthesized image and the third image at the late-stage synthesis ratio generated on the basis of the late-stage determination result and the late-stage detection result.

Further, in the first aspect, the plurality of images may each differ in exposure time. Consequently, it is possible to synthesize a plurality of images, each of which differs in exposure time.

Additionally, according to a second aspect of the present technology, there is provided an imaging device including an imaging section, a detection section, a synthesis ratio generation section, and a synthesis section. The imaging section sequentially acquires a plurality of images captured in chronological order. The detection section detects whether a light source has blinked during an exposure period of a detection target image among the plurality of images, and outputs a detection result. The synthesis ratio generation section generates, according to the detection result, a synthesis ratio such that an image with blinking of the light source that is among the plurality of images is lower in percentage than an image with no blinking of the light source. The synthesis section synthesizes the plurality of images at the synthesis ratio. Consequently, in a case where a plurality of images is sequentially captured when a light source is blinking, it is possible to synthesize the plurality of images at a synthesis ratio for making the percentage of a detection target image lower than the percentage of an image other than the detection target image.

Advantageous Effects of Invention

The present technology is able to provide an excellent advantage of improving the image quality of a synthesized image in an image processing device that synthesizes a plurality of images. It should be noted that the present technology is not necessarily limited to advantages described here and is capable of providing any other advantages described later in the present disclosure.

DESCRIPTION OF EMBODIMENTS

Modes for implementing the present technology (hereinafter referred to as embodiments) will now be described. The description will be given in the following order:

1. First embodiment (example where light source blinking during exposure period is detected to synthesize two images)
2. Second embodiment (example where light source blinking during exposure period is detected to synthesize three images)
3. Exemplary applications to mobile body 1. First Embodiment

[Exemplary Configuration of Imaging Device]

Figure 1:
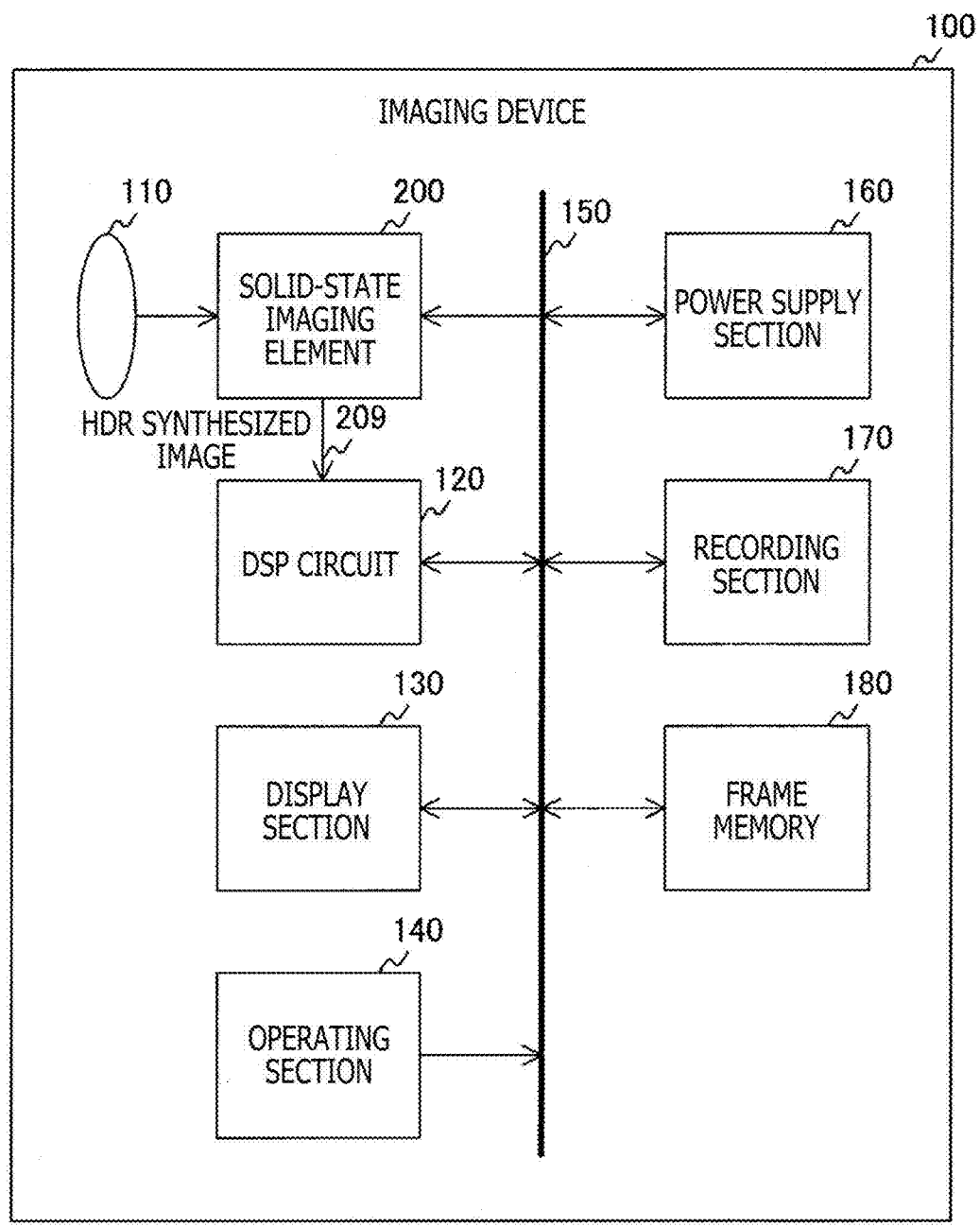
FIG. 1 is a block diagram illustrating an exemplary configuration of an imaging device according to a first embodiment of the present technology.

FIG. 1 is a block diagram illustrating an exemplary configuration of an imaging device 100 according to a first embodiment. This imaging device 100 includes an optical section 110, a solid-state imaging element 200, a DSP (Digital Signal Processing) circuit 120, a display section 130, an operating section 140, a bus 150, a power supply section 160, a recording section 170, and a frame memory 180.

The optical section 110 collects incident light from an object and guides the incident light to the solid-state imaging element 200. The optical section 110 includes, for example, a plurality of lenses, an aperture, a shutter, and the like.

The solid-state imaging element 200 captures an image (image data) by photoelectrically converting the incident light. This solid-state imaging element 200 performs various image processes on the captured image. These image processes include a synthesis process of synthesizing a plurality of images. For example, an HDR (High-Dynamic-Range rendering) synthesis process is performed as the synthesis process. The HDR synthesis process is for synthesizing a plurality of images that differ from each other in exposure time. The solid-state imaging element 200 subjects an image to HDR synthesis process to obtain an HDR synthesized image, and outputs the obtained HDR synthesized image to a DSP circuit 120 through a signal line 209.

The DSP circuit 120 performs predetermined digital signal processing on the HDR synthesized image from the solid-state imaging element 200. The DSP circuit 120 performs various digital signal processes including, for example, a mosaic process, a white balance process, a filtering process, and the like. In these processes, the DSP circuit 120 causes the frame memory 180 to retain the HDR synthesized image as needed. Subsequently, the DSP circuit 120 outputs the processed HDR synthesized image to the display section 130 and the recording section 170.

The display section 130 displays, for example, an HDR synthesized image and an operating screen. The operating section 140 generates an operating signal in accordance with user operation.

The bus 150 provides a common path that allows data to be exchanged between the solid-state imaging element 200, the DSP circuit 120, the display section 130, the operating section 140, the power supply section 160, the recording section 170, and the frame memory 180.

The power supply section 160 supplies electrical power to circuits in the imaging device 100. The recording section 170 records an HDR synthesized image. The frame memory 180 retains an HDR synthesized image (frame).

It should be noted that the optical section 110, the solid-state imaging element 200, the DSP circuit 120, the display section 130, the operating section 140, the bus 150, the power supply section 160, the recording section 170, and the frame memory 180 are disposed in the same device but they may be dispersively disposed in a plurality of devices. For example, an alternative is to dispose the optical section 110 and the solid-state imaging element 200 in the imaging device, and dispose the DSP circuit 120 and the like in an information processing device.

[Exemplary Configuration of Solid-State Imaging Element]

Figure 2:
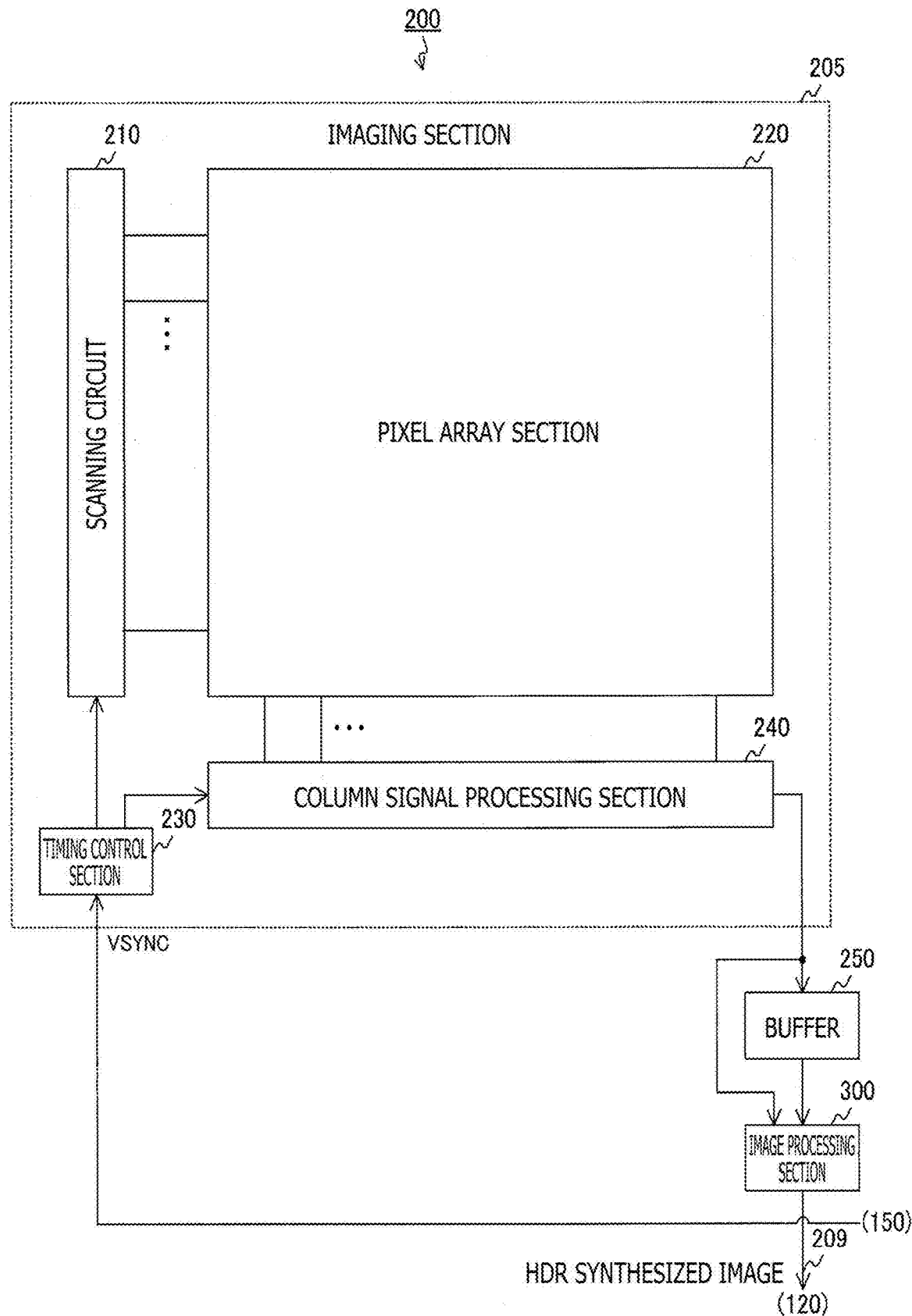
FIG. 2 is a block diagram illustrating an exemplary configuration of a solid-state imaging element in the first embodiment of the present technology.

FIG. 2 is a block diagram illustrating an exemplary configuration of the solid-state imaging element 200 in the first embodiment of the present technology. This solid-state imaging element 200 includes an imaging section 205, a buffer 250, and an image processing section 300.

The imaging section 205 sequentially captures a plurality of images. This imaging section 205 includes a scanning circuit 210, a pixel array section 220, a timing control section 230, and a column signal processing section 240.

In the pixel array section 220, a plurality of pixels is arrayed in a two-dimensional grid. A set of pixels arrayed in a predetermined direction is hereinafter referred to as a "row" or a "line," and a set of pixels arrayed in a direction perpendicular to the row is hereinafter referred to as a "column."

The scanning circuit 210 sequentially selects a row (line) and exposes the selected row (line) for an exposure time. Each of the pixels in the selected row outputs a pixel signal based on the exposure time to the column signal processing section 240. A method of exercising exposure control to sequentially expose lines as described above is called a rolling shutter method.

The timing control section 230 controls operation timing of each of the scanning circuit 210 and the column signal processing section 240 in synchronism with a vertical synchronization signal VSYNC having a predetermined frequency (e.g., 60 Hz). The vertical synchronization signal VSYNC is inputted, for example, from the outside of the solid-state imaging element 200 through the bus 150.

The column signal processing section 240 performs an AD (Analog to Digital) conversion process, a CDS (Correlated Double Sampling) process, or other predetermined signal processing on each of pixel signals from the selected row. This column signal processing section 240 generates line data including pixel signals subjected to signal processing, and supplies the generated line data to the buffer 250 and the image processing section 300. An image based on this line data is also referred to as a RAW image.

The buffer 250 retains and delays a predetermined number of line data. This buffer 250 supplies each of the delayed line data to the image processing section 300.

The image processing section 300 performs predetermined image process including a synthesis process (e.g., HDR synthesis process) on images including the line data. In this HDR synthesis process, the image processing section 300 synthesizes a current RAW image including undelayed line data and a previous RAW image including delayed line data. In the HDR synthesis process, these two images differ from each other in exposure time. The RAW image subjected to long-time exposure is hereinafter referred to as a "long-time exposure image," and the RAW image subjected to short-time exposure is hereinafter referred to as a "short-time exposure image." The image processing section 300 outputs, to the DSP circuit 120, an HDR synthesized image that is subjected to the HDR synthesis process.

It should be noted that the image processing section 300 is disposed in the solid-state imaging element 200 but an alternative configuration may be adopted so that at least a part of the process of the image processing section 300 is performed by an element external to the solid-state imaging element 200, such as the DSP circuit 120.

[Exemplary Configuration of Image Processing Section]

Figure 3:
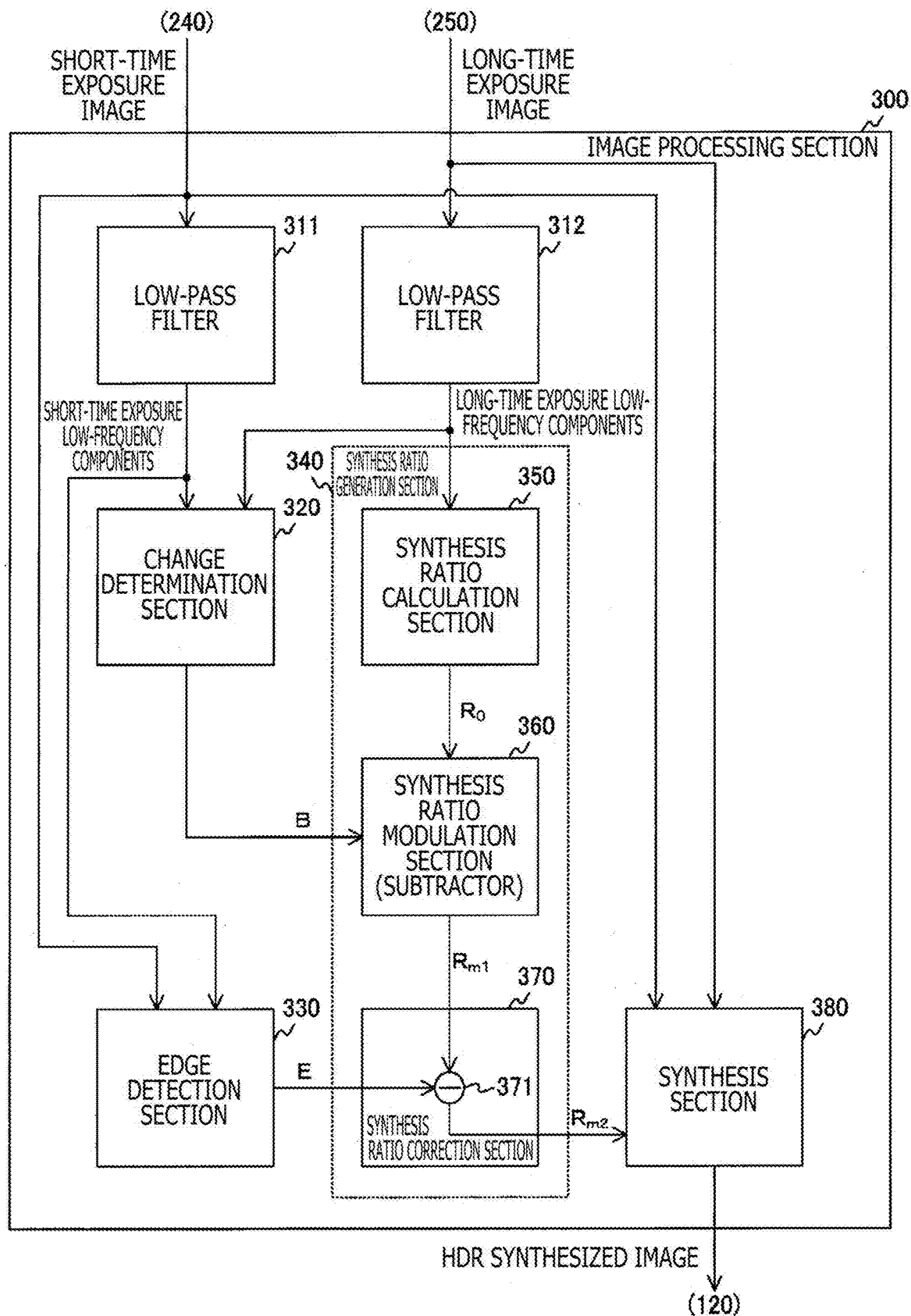
FIG. 3 is a block diagram illustrating an exemplary configuration of an image processing section in the first embodiment of the present technology.

FIG. 3 is a block diagram illustrating an exemplary configuration of the image processing section 300 in the first embodiment of the present technology. This image processing section 300 includes low-pass filters 311 and 312, a change determination section 320, an edge detection section 330, a synthesis ratio generation section 340, and a synthesis section 380.

The low-pass filter 311 passes low-frequency components of a short-time exposure image that have a frequency lower than a predetermined frequency. This low-pass filter 311 supplies the low-frequency components to the change determination section 320 and the edge detection section 330 as short-time exposure low-frequency components.

The low-pass filter 312 passes low-frequency components of a long-time exposure image that have a frequency lower than a predetermined frequency. This low-pass filter 312 supplies the low-frequency components to the change determination section 320 and the synthesis ratio generation section 340 as long-time exposure low-frequency components. For example, averaging filters or Gaussian filters are used as the low-pass filters 311 and 312.

The change determination section 320 checks each pixel to determine, on the basis of the long-time exposure low-frequency components and the short-time exposure low-frequency components, whether a brightness change is present between a long-time exposure image and a short-time exposure image. In a case where the number of pixels is N (N is an integer), a determination is made N times on each set of long-time exposure image and short-time exposure image. For example, in a case where a light source blinking on a periodic basis is to be imaged in synchronism with a light emission control signal having a frequency (e.g., 60 Hz) close to the vertical synchronization signal VSYNC, the light source may turn on for one of the long-time exposure image and the short-time exposure image and turn off for the other one. In such an instance, the change determination section 320 determines that a brightness change is present.

Meanwhile, in a case where there is no light source blinking on a periodic basis or a light source turns on or off for both of the long-time exposure image and the short-time exposure image, the change determination section 320 determines that no brightness change is present. The result of brightness change determination is indicated, for example, by a real number between "0" and "1" that represents the degree of brightness change. The change determination section 320 supplies the determination result to the synthesis ratio generation section 340. It should be noted that the change determination section 320 is an example of a determination section defined by the appended claims.

The edge detection section 330 detects presence of an edge along a line in a short-time exposure image in order to detect whether a light source has blinked during an exposure time of the short-time exposure image. The result of edge detection is indicated, for example, by a real number between "0" and "1" that represents the degree of edge. The edge detection section 330 supplies the detection result to the synthesis ratio generation section 340. It should be noted that the short-time exposure image is an example of a detection target image defined by the appended claims, and that the edge detection section 330 is an example of a detection section defined by the appended claims.

The synthesis ratio generation section 340 generates a synthesis ratio in the HDR synthesis process on an individual pixel basis in accordance with the long-time exposure low-frequency components, the determination result and the detection result. In a case where the number of pixels is N, the synthesis ratio is generated N times for each set of long-time exposure image and short-time exposure image. The synthesis ratio is indicated, for example, by a real number between "0" and "1." This synthesis ratio generation section 340 includes a synthesis ratio calculation section 350, a synthesis ratio modulation section 360, and a synthesis ratio correction section 370.

For each pixel in the long-time exposure low-frequency components from the low-pass filter 312, the synthesis ratio calculation section 350 calculates the synthesis ratio based on pixel brightness. For example, as pixel brightness increases, the calculated synthesis ratio has a higher percentage of long-time exposure image. The synthesis ratio calculation section 350 outputs the calculated synthesis ratio to the synthesis ratio modulation section 360.

Here, if a long-time exposure image (RAW image) that has not passed through the low-pass filter 312 is used as it is by the synthesis ratio calculation section 350 in order to calculate the synthesis ratio, a synthesis ratio change may occur at a pixel position that varies from one color to another. This may lead to the appearance of a false color signal in a synthesized image. In the imaging device 100, therefore, the synthesis ratio calculation section 350 uses low-frequency components that are generated from a RAW image by the low-pass filter 312. This makes it possible to suppress the generation of a false color signal. Further, the low-pass filter 312 is able to reduce influence of random noise existing in the RAW image.

It should be noted that the adopted configuration may exclude the low-pass filter 312 in a case where, for example, monochrome image data is handled so that a false color signal does not cause a problem or the amount of random noise is small. Similarly, the adopted configuration may exclude the low-pass filter 311 as well.

The synthesis ratio modulation section 360 modulates the synthesis ratio of each pixel in accordance with the result of brightness change determination. As regards either the long-time exposure image or the short-time exposure image, this synthesis ratio modulation section 360 performs modulation to make the percentage of pixels in an image of a light source turned on higher than the percentage of the corresponding pixels in an image of the light source turned off. The reason is that when the percentage of pixels in the image of the light source turned off is increased, a light source portion of the HDR synthesized image has insufficient luminance. For the modulation, for example, a computation expressed by the following equation is performed. The synthesis ratio modulation section 360 supplies the modulated synthesis ratio to the synthesis ratio correction section 370.

$$R_{m1} = R_0 - B \qquad \text{Equation 1}$$

In the above equation, $R_{m1}$ is a modulated synthesis ratio, $R_0$ is an unmodulated synthesis ratio, and B is a value indicative of the result of brightness change determination.

The synthesis ratio correction section 370 corrects the synthesis ratio $R_{m1}$ of each pixel in accordance with the result of edge detection. In a case where an edge (blinking of light source) exists in a short-time exposure image, this synthesis ratio correction section 370 makes a correction for making the percentage of edgy pixels lower than the percentage of the corresponding pixels in a long-time exposure image. For example, when making a correction, the synthesis ratio correction section 370 uses a subtractor 371 to perform a computation expressed by the following equation. The synthesis ratio correction section 370 supplies the corrected synthesis ratio to the synthesis section 380.

$$R_{m2} = R_{m1} - E \qquad \text{Equation 2}$$

In the above equation, $R_{m2}$ is a corrected synthesis ratio, and E is a value indicative of the result of edge detection. This makes it possible to decrease the synthesis ratio of pixels darkened due to a light source turned off during exposure, and thus prevent the synthesis of such pixels from generating a streaky image within a synthesized image The synthesis section 380 synthesizes a long-time exposure image and a short-time exposure image at the synthesis ratio $R_{m2}$ supplied from the synthesis ratio generation section 340. This synthesis section 380 performs synthesis in accordance, for example, with the following equation:

$$P_{HDR} = P_L \times (1 - R_{m2}) + P_S \times R_{m2} \qquad \text{Equation 3}$$

In the above equation, $P_{HDR}$ is a pixel value of a pixel in the HDR synthesized image, $P_L$ is a pixel value of the corresponding pixel in the long-time exposure image, and $P_S$ is a pixel value of the corresponding pixel in the short-time exposure image.

It should be noted that the synthesis ratio generation section 340 obtains a real number between "0" and "1" as the synthesis ratio $R_{m2}$ but the synthesis ratio generation section 340 may obtain a percentage value between "0" and "100" as the synthesis ratio $R_{m2}$. In such an instance, the right side of Equation 3 should be divided by the value "100."

Figure 4:
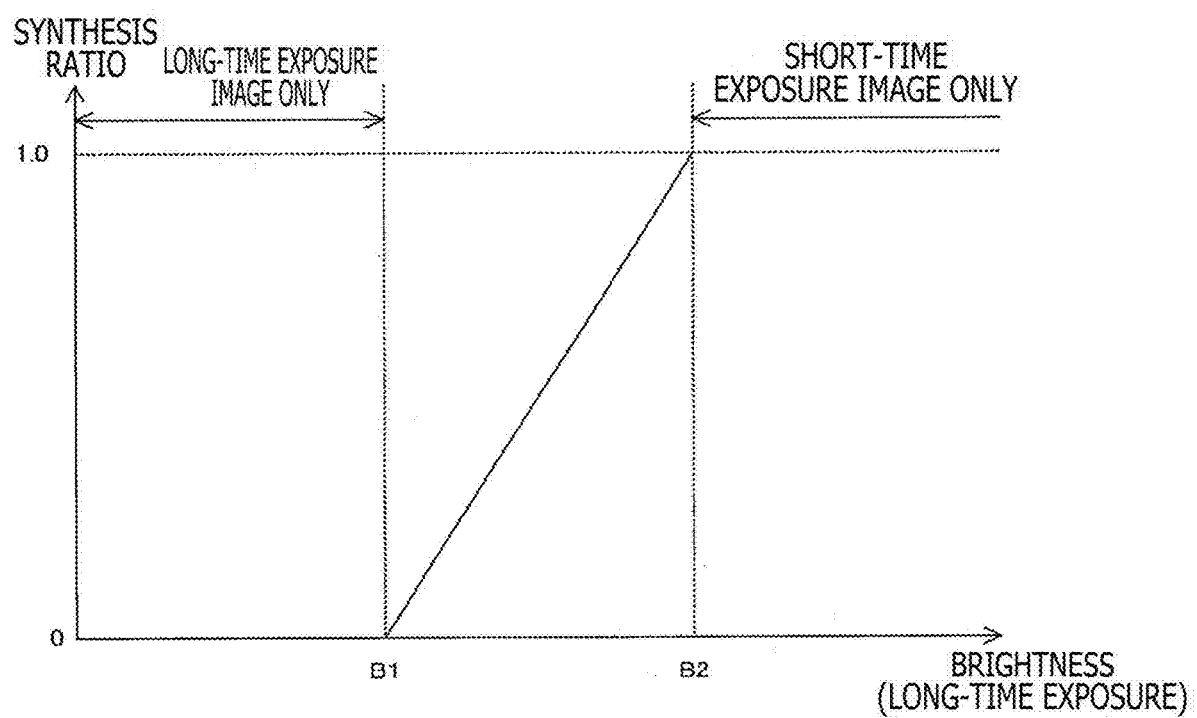
FIG. 4 is a graph illustrating an exemplary relationship between brightness and synthesis ratio in the first embodiment of the present technology.

FIG. 4 is a graph illustrating an exemplary relationship between brightness and synthesis ratio in the first embodiment of the present technology. In FIG. 4, the vertical axis represents the synthesis ratio $R_0$, and the horizontal axis represents the brightness of a pixel in the long-time exposure low-frequency components.

In a case where, for example, the brightness of a pixel is between "0" and "B1" the calculated synthesis ratio $R_0$ of the pixel is "0." According to Equations 1 to 3, only the long-time exposure image is used in HDR synthesis in a case where neither modulation nor correction is performed. In a case where the brightness is between "B1" and "B2," the calculated synthesis ratio $R_0$ is between "0" and "1" in proportion to the brightness. Here, B1 is a real number, and B2 is a real number greater than B1.

Meanwhile, in a case where the brightness is higher than "B2," the calculated synthesis ratio $R_0$ is "1." According to Equations 1 to 3, only the short-time exposure image is used in HDR synthesis in a case where neither modulation nor correction is performed.

It should be noted that the synthesis ratio generation section 340 calculates the synthesis ratio $R_0$ from the brightness of long-time exposure low-frequency components but the present technology is not limited to such a configuration. For example, the synthesis ratio generation section 340 may calculate the synthesis ratio $R_0$ from the brightness of short-time exposure low-frequency components. Further, the synthesis ratio generation section 340 may use a fixed value as the synthesis ratio $R_0$. In a case where such a fixed value is used, the synthesis ratio generation section 340 does not require the synthesis ratio calculation section 350.

Incidentally, in the case where the brightness is between "B1" and "B2," the synthesis ratio $R_0$ calculated by the synthesis ratio generation section 340 is between "0" and "1." However, the present technology is not limited to such a configuration. For example, the synthesis ratio generation section 340 may generate the value "1" as the synthesis ratio $R_O$ in a case where the brightness is higher than a predetermined value, and may generate the value "0" as the synthesis ratio $R_O$ in a case where the brightness is equal to or lower than the predetermined value.

[Exemplary Configuration of Change Determination Section]

Figure 5:
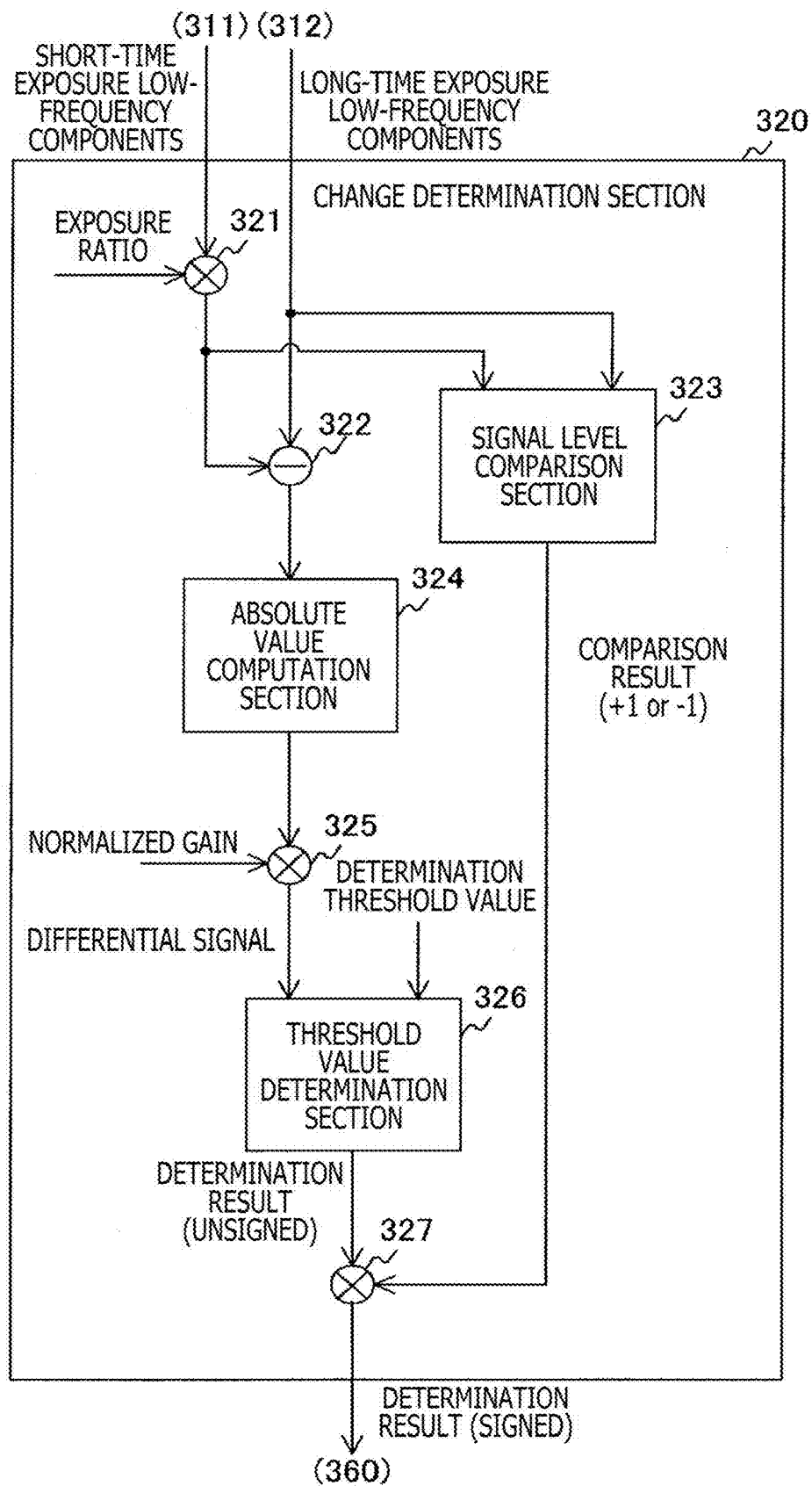
FIG. 5 is a block diagram illustrating an exemplary configuration of a change determination section in the first embodiment of the present technology.

FIG. 5 is a block diagram illustrating an exemplary configuration of the change determination section 320 in the first embodiment of the present technology. This change determination section 320 includes a multiplier 321, a subtractor 322, a signal level comparison section 323, an absolute value computation section 324, a multiplier 325, a threshold value determination section 326, and a multiplier 327.

The multiplier 321 multiplies the signal level of each pixel in the short-time exposure low-frequency components by an exposure ratio $R_E$. Incidentally, the exposure ratio $R_E$ is expressed by the following equation. The multiplier 321 handles the obtained multiplication result as Ls, and outputs the multiplication result Ls to the subtractor 322 and the signal level comparison section 323.

$$R_E = T_L/T_S$$

In the above equation, $T_L$ is exposure time of a long-time exposure image, and $T_S$ is exposure time of a short-time exposure image.

The subtractor 322 subtracts the multiplication result Ls of each pixel in the long-time exposure low-frequency components from the signal level of the corresponding pixel. This subtractor 322 outputs the obtained subtraction result to the absolute value computation section 324.

The absolute value computation section 324 computes an absolute value of the subtraction result and supplies the computed absolute value to the multiplier 325. The multiplier 325 multiplies the absolute value of the subtraction result by a predetermined normalized gain. Here, the normalized gain is determined by considering a gain applied to an input signal (for example, a gain used for automatic gain control, a calibration gain, a level balance gain, an exposure ratio gain or the like) on an individual color basis. The multiplier 325 handles a signal obtained from the multiplication as a differential signal, and outputs the differential signal to the threshold value determination section 326.

The threshold value determination section 326 determines whether a predetermined determination threshold value is exceeded by the level of the differential signal. For example, the threshold value determination section 326 subtracts the determination threshold value from the differential signal to obtain a determination result, and outputs the obtained determination result to the multiplier 327.

The signal level comparison section 323 compares the multiplication result Ls with the signal level of the corresponding pixel in the long-time exposure low-frequency components. In a case where the multiplication result Ls is lower than the corresponding signal level, the signal level comparison section 323 outputs the value "+1" to the multiplier 327 as a comparison result. Meanwhile, in a case where the multiplication result Ls is equal to or higher than the corresponding signal level, the signal level comparison section 323 outputs the value "−1" to the multiplier 327 as the comparison result.

The multiplier 327 multiplies the determination result of the threshold value determination section 326 by the comparison result ("+1" or "−1"), and outputs the result of multiplication to the synthesis ratio modulation section 360 as a signed determination result.

Figure 6:
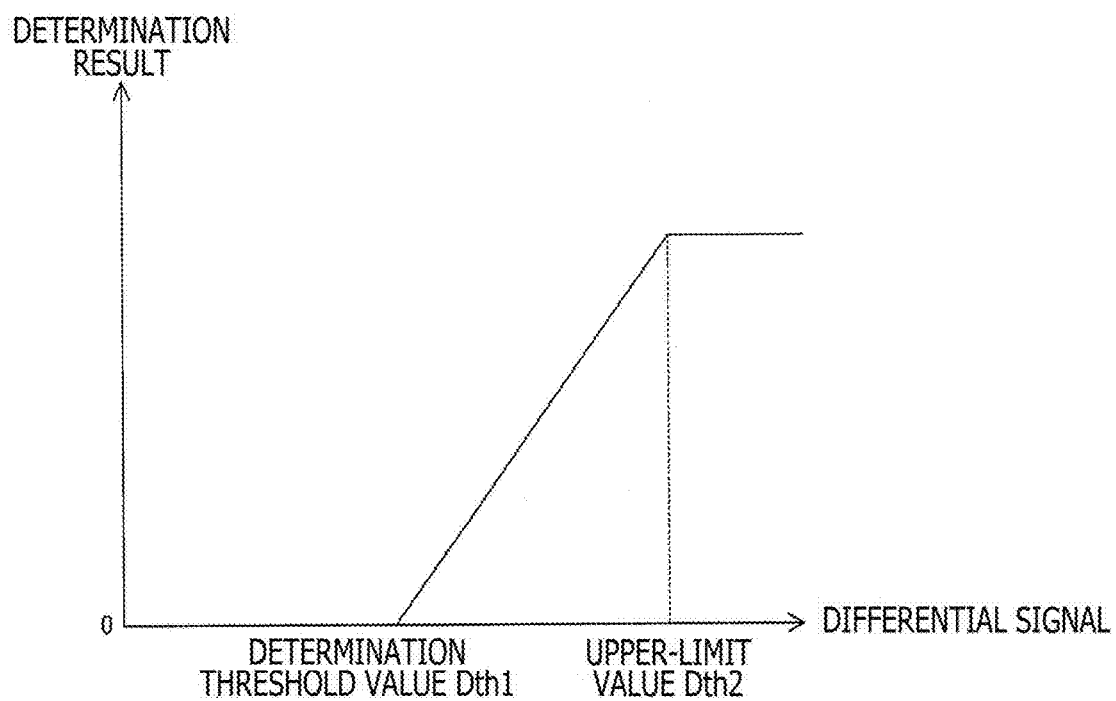
FIG. 6 is a graph illustrating an exemplary relationship between differential signal and determination result in the first embodiment of the present technology.

FIG. 6 is a graph illustrating an exemplary relationship between differential signal and determination result in the first embodiment of the present technology. In a case where the differential signal is equal to or lower than a determination threshold value Dth1, a determination result of "0" is outputted. Meanwhile, in a case where the differential signal is higher than the determination threshold value Dth1 and equal to or lower than an upper-limit value Dth2, a value proportional to the differential signal is outputted as the determination result. Here, Dth1 is a predetermined real number, and Dth2 is a real number greater than Dth1. Meanwhile, in a case where the differential signal is higher than the upper-limit value Dth2, a fixed value is outputted as the determination result.

It should be noted that the threshold value determination section 326 outputs a value proportional to the differential signal as the determination result in a case where the differential signal is higher than the determination threshold value Dth1 and equal to or lower than the upper-limit value Dth2 but the present technology is not limited to such a configuration. For the example, the threshold value determination section 326 may output a fixed value as the determination result in a case where the differential signal is higher than the determination threshold value Dth1, and may output a determination result of "0" in a case where the differential signal is equal to or lower than the determination threshold value Dth1.

[Exemplary Configuration of Edge Detection Section]

Figure 7:
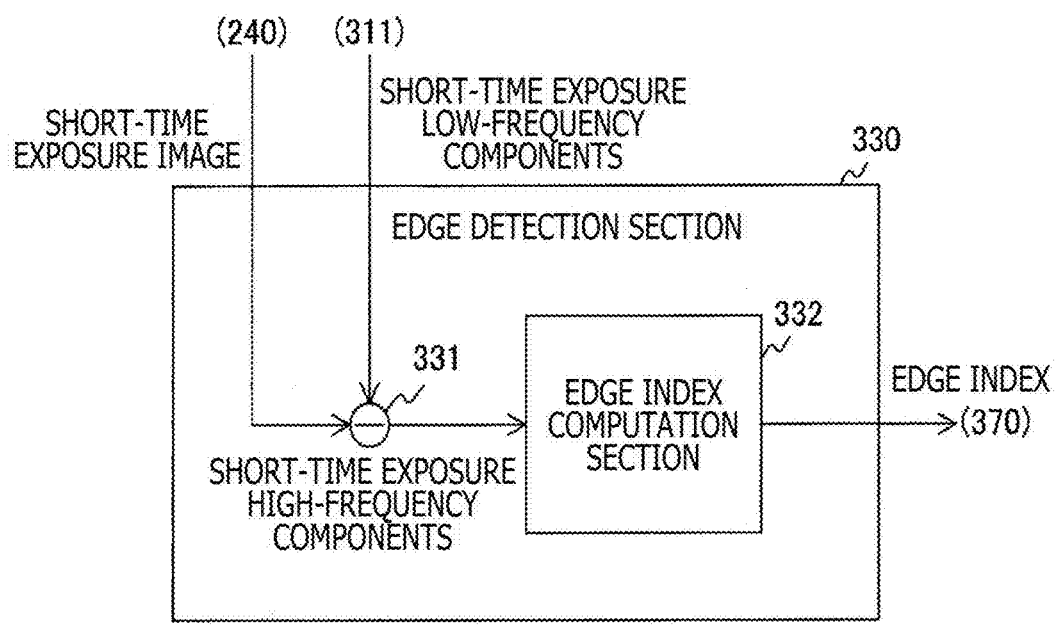
FIG. 7 is a block diagram illustrating an exemplary configuration of an edge detection section in the first embodiment of the present technology.

FIG. 7 is a block diagram illustrating an exemplary configuration of the edge detection section 330 in the first embodiment of the present technology. This edge detection section 330 includes a subtractor 331 and an edge index computation section 332.

From the pixel value of each pixel in the short-time exposure image, the subtractor 331 subtracts the pixel value of the corresponding pixel in the short-time exposure low-frequency components. The subtractor 331 outputs the result of subtraction to the edge index computation section 332 as short-time exposure high-frequency components.

For each pixel in the short-time exposure high-frequency components, the edge index computation section 332 computes a value based on the signal level of the pixel as an edge index indicative of the degree of edge. This edge index computation section 332 supplies the computed edge index to the synthesis ratio correction section 370 as a detection result.

Figure 8:
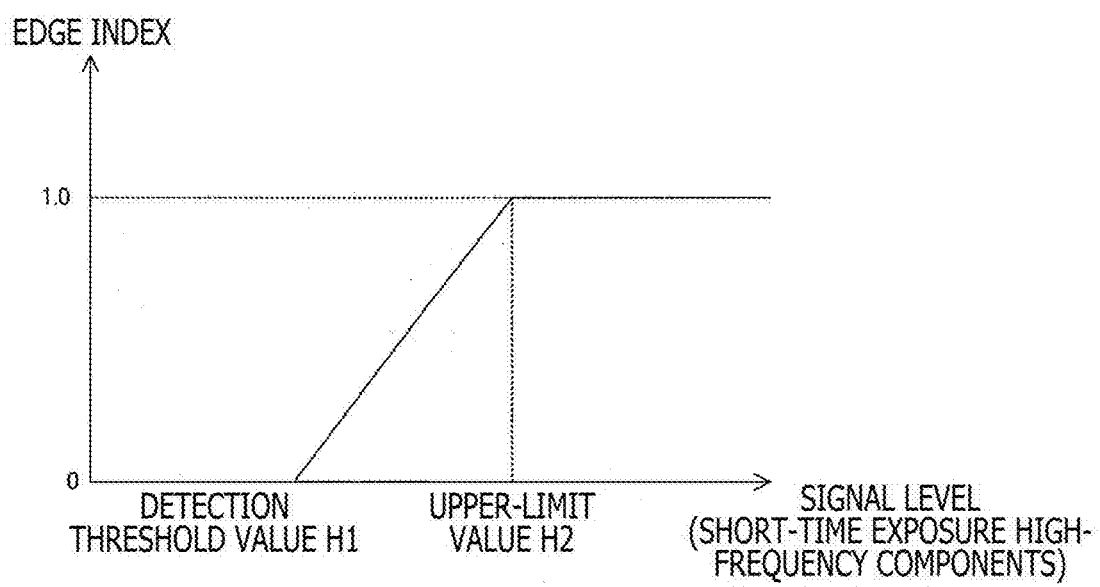
FIG. 8 is a graph illustrating an exemplary relationship between edge index and signal level in the first embodiment of the present technology.

FIG. 8 is a graph illustrating an exemplary relationship between edge index and signal level in the first embodiment of the present technology. In FIG. 8, the vertical axis represents the edge index, and the horizontal axis represents the signal level of a line in the short-time exposure high-frequency components. In a case where the signal level is equal to or lower than a detection threshold value H1, an edge index of "0" is outputted. Meanwhile, in a case where the signal level is higher than the detection threshold value H1 but equal to or lower than an upper-limit value H2, a value between "0" and "1" and proportional to the signal level is outputted as the edge index. Here, H1 is a predetermined real number, and H2 is a real number greater than H1. Meanwhile, in a case where the differential signal is higher than the upper-limit value H2, an edge index of "1" is outputted.

It should be noted that the edge index computation section 332 outputs a value between "0" and "1" as the edge index in a case where the signal level is higher than the detection threshold value H1 but equal to or lower than the upper-limit value H2 but the present technology is not limited to such a configuration. For the example, the edge index computation section 332 may output the value "1" as the edge index in a case where the signal level is higher than the detection threshold value H1, and may output the value of "0" as the edge index in a case where the signal level is equal to or lower than the detection threshold value H1.

Figure 9:
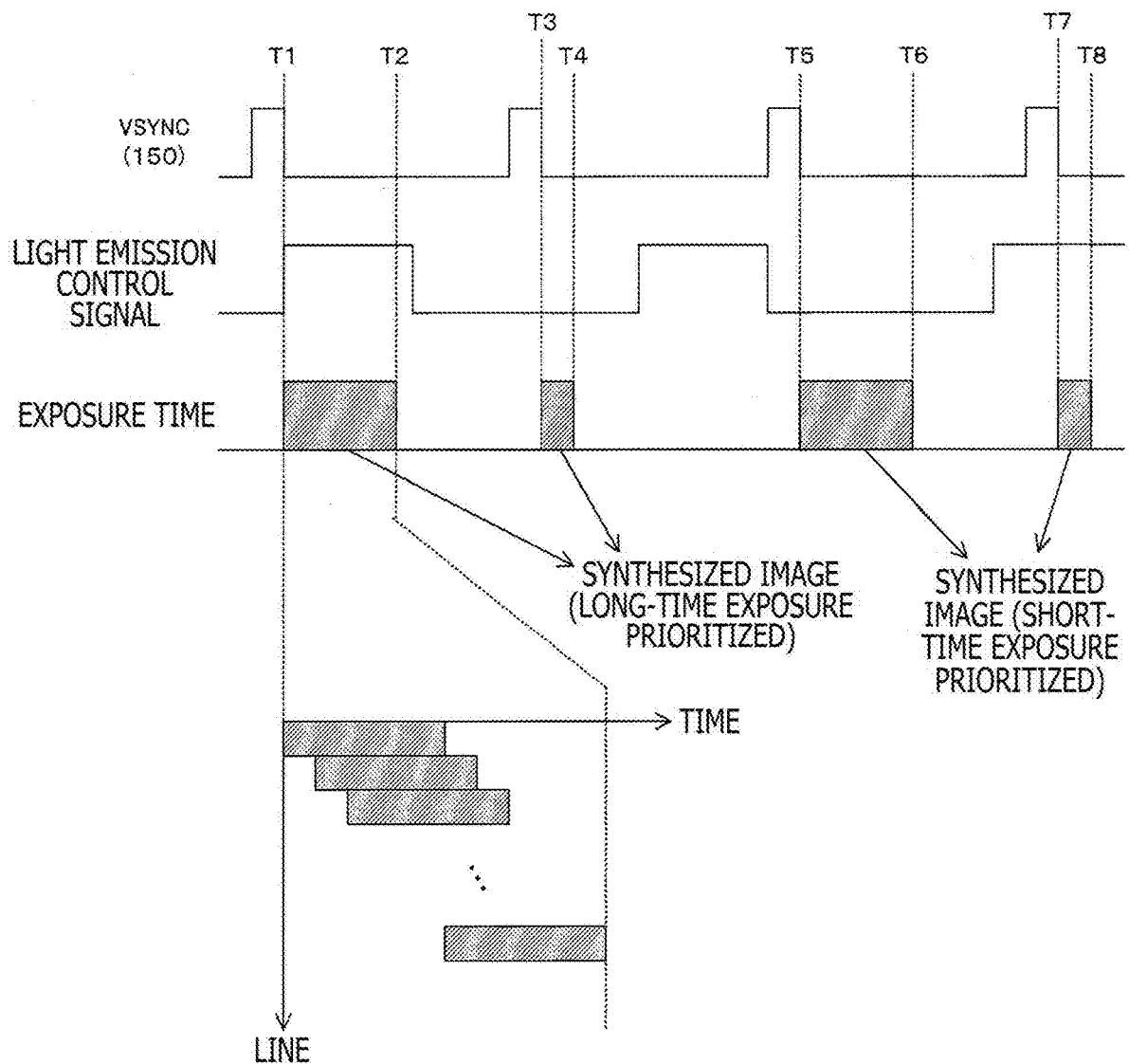
FIG. 9 is a timing diagram illustrating an example of exposure timing of the imaging device according to the first embodiment of the present technology.

FIG. 9 is a timing diagram illustrating an example of exposure timing of the imaging device 100 according to the first embodiment of the present technology. The imaging device 100 captures a long-time exposure image and a short-time exposure image in chronological order in synchronism with the vertical synchronization signal VSYNC. It is assumed that a light source blinking periodically in synchronism with a light emission control signal having a predetermined frequency exists within an imaging range. The light emission control signal is, for example, a rectangular wave. It is assumed that the light source is turned on while the light emission control signal is at a high level and that the light source is turned off while the light emission control signal is at a low level.

The imaging device 100 starts exposure of the first line in the long-time exposure image at time point T1 at which the vertical synchronization signal VSYNC rises. Subsequently, at time point T2, the imaging device 100 ends exposure of the last line in the long-time exposure image.

After time point T2, the imaging device 100 starts exposure of the first line in the short-time exposure image at time point T3 at which the vertical synchronization signal VSYNC falls. Subsequently, at time point T4, the imaging device 100 ends exposure of the last line in the short-time exposure image.

Here, it is assumed that the light source is turned on during the exposure period of the long-time exposure image, which is between time point T1 and time point T2, and that the light source is turned off during the exposure period of the short-time exposure image, which is between time point T3 and time point T4.

In the above instance, the long-time exposure image captured while the light source is turned on is relatively bright so that the differential signal exceeds the determination threshold value. Therefore, the imaging device 100 determines that a brightness change is present. The imaging device 100 then generates a synthesized image by preferentially increasing the percentage of long-time exposure image captured while the light source is turned on.

Further, the imaging device 100 captures a long-time exposure image during a period between time point T5 and time point T6, and captures a short-time exposure image during a period between time point T7 and time point T8.

Here, it is assumed that the light source is turned off during the exposure period of the long-time exposure image, which is between time point T5 and time point T6, and that the light source is turned on during the exposure period of the short-time exposure image, which is between time point T7 and time point T8.

In the above instance, the short-time exposure image captured while the light source is turned on is relatively bright so that the differential signal exceeds the determination threshold value. Therefore, the imaging device 100 determines that a brightness change is present. The imaging device 100 then generates a synthesized image by preferentially increasing the percentage of short-time exposure image captured while the light source is turned on.

Here, if synthesis is performed without determining the brightness, a dark image captured with the light source turned off is subjected to the synthesis so that the brightness of a light source portion is insufficient. Therefore, in a case where the light source is turned on for one of the long-time exposure image and the short-time exposure image and is turned off for the other one, the imaging device 100 performs synthesis by increasing the percentage of a bright image obtained when the light source is turned on. This makes it possible to avoid insufficiency of brightness of a light source portion in the synthesized image.

Figure 10:
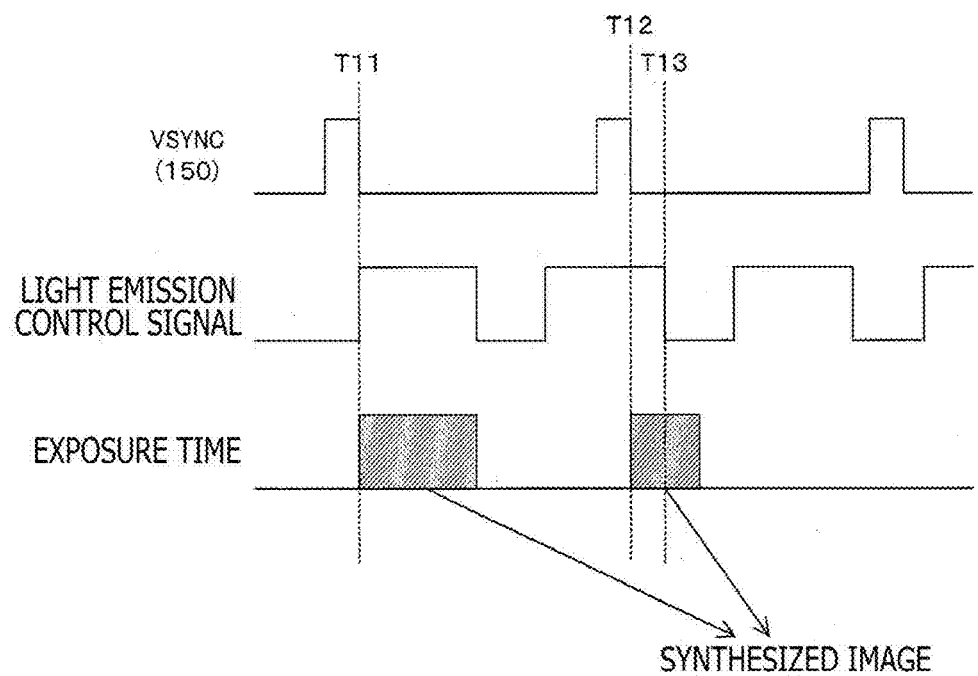
FIG. 10 is a timing diagram illustrating an example of exposure timing of the imaging device according to the first embodiment of the present technology in a case where a light source blinks during a short-time exposure.

FIG. 10 is a timing diagram illustrating an example of exposure timing of the imaging device 100 according to the first embodiment of the present technology in a case where the light source blinks during a short-time exposure. At time point T11 at which the vertical synchronization signal VSYNC rises, the imaging device 100 starts capturing a long-time exposure image. Subsequently, at time point T12, the imaging device 100 starts capturing a short-time exposure image. Here, it is assumed that the light source is turned on during the period of long-time exposure.

Here, it is assumed that the light source is turned on during a period between time point T12 at which exposure of the short-time exposure image starts and time point T13 during the period of that exposure, and that the light source is turned off at and after time point T13. In this case, the imaging device 100 detects that an edge exists in the short-time exposure image.

Figure 11:
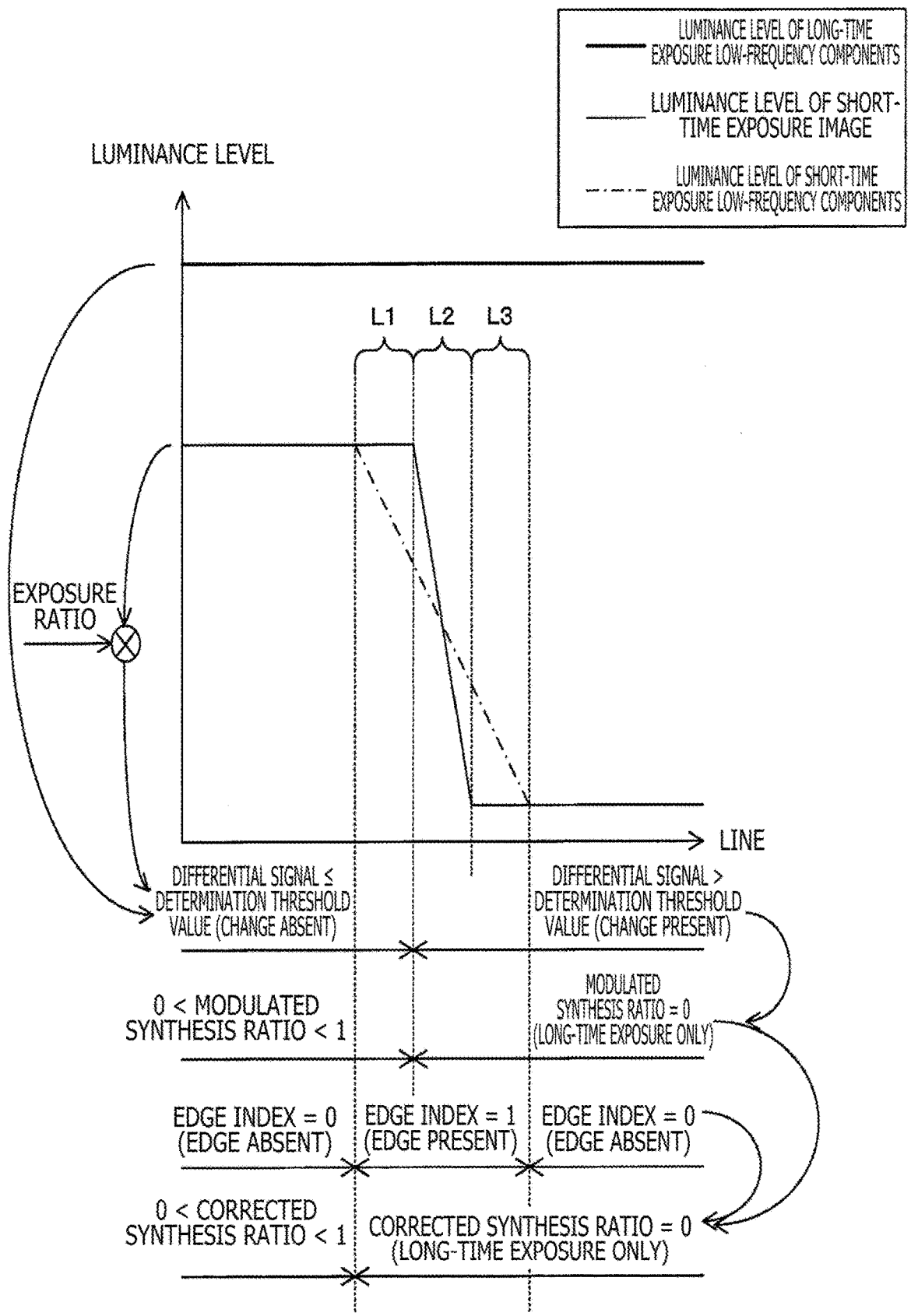
FIG. 11 is a graph illustrating an exemplary luminance level of each line in the first embodiment of the present technology in a case where the light source blinks during a short-time exposure.

FIG. 11 is a graph illustrating an exemplary luminance level of each line in the first embodiment of the present technology in a case where the light source blinks during a short-time exposure. In FIG. 11, the vertical axis represents a luminance level, and the horizontal axis represents a line. Further, a thick solid line indicates the luminance level of each line in long-time exposure low-frequency components. A thin solid line indicates the luminance level of each line in a short-time exposure image. A one-dot chain line indicates the luminance level of each line in short-time exposure low-frequency components.

In a long-time exposure image, the luminance level varies insignificantly. However, the luminance level has a significant slope at lines L1 to L3 in the short-time exposure low-frequency components in FIG. 11 because such lines are exposed before and after time point T13 at which the light source has blinked as indicated in FIG. 10.

In lines up to line L1, the differential signal between the short-time exposure low-frequency components multiplied by the exposure ratio and the long-time exposure low-frequency components is equal to or lower than the determination threshold value. Therefore, the imaging device 100 determines that no brightness change is present. Because no brightness change is present, the imaging device 100 modulates the synthesis ratio into a value greater than "0" but smaller than "1." In other words, the short-time exposure image is reflected in the synthesized image.

Meanwhile, in line L2 and subsequent lines, the differential signal exceeds the determination threshold value. Therefore, the imaging device 100 determines that a brightness change is present. Because a brightness change is present, the imaging device 100 modulates the synthesis ratio into the value "0." In other words, the short-time exposure image is not reflected in the synthesized image.

Here, if the imaging device 100 performs HDR synthesis without changing the modulated synthesis ratio, an image of streaks that are nonexistent in reality (faulty image) may be generated in a portion of a synthesized image that corresponds to line L1.

A faulty image is generated because, although the brightness is changed at the beginning of turning off of the light source at line L1, it is erroneously determined due to an inappropriate determination threshold value that no change is present as the determination threshold value is not exceeded by the differential signal. Because of such an erroneous determination, a dark line L1 is subjected to the synthesis so that a streaky faulty image is generated within the synthesized image. No erroneous determination occurs when the determination threshold value is an appropriate value. However, the appropriate value varies with imaging environment. Therefore, it is difficult to adjust the determination threshold value.

In view of the above circumstances, the imaging device 100 according to this first embodiment detects whether an edge exists along a line within a short-time exposure image. If the light source blinks during the exposure period, an edge arises along a line as far as the rolling shutter method is adopted. Consequently, by detecting the presence of an edge, the imaging device 100 is able to detect whether the light source has blinked during the exposure period.

The imaging device 100 subsequently corrects the synthesis ratio to "0" because the above-mentioned erroneous determination may occur as regards an edge. In other words, as regards an edge, the short-time exposure image is not reflected in the synthesized image. As a result, the dark line L1 is not subjected to the synthesis. This makes it possible to avoid the generation of a streaky artifact in the synthesized image.

Figure 12:
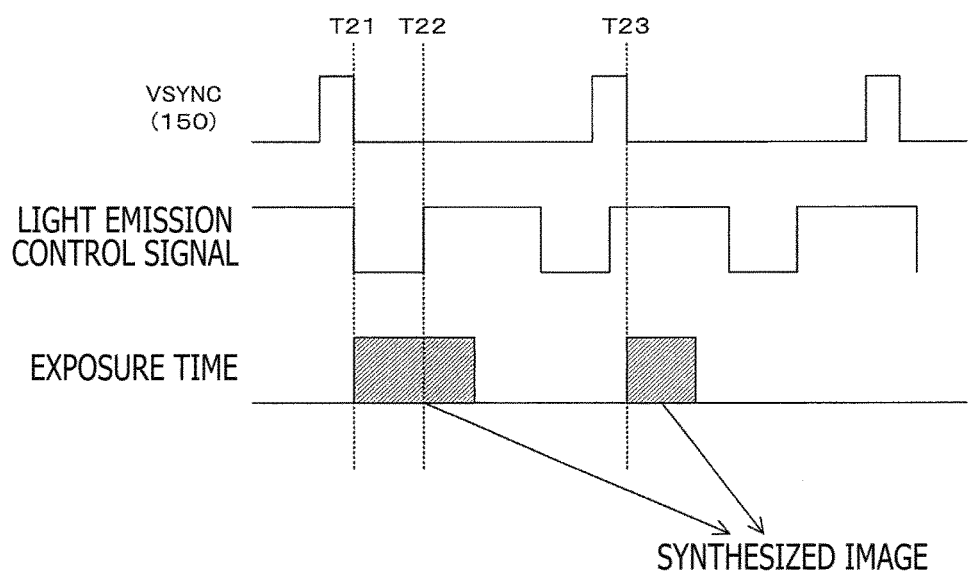
FIG. 12 is a timing diagram illustrating an example of exposure timing of the imaging device according to the first embodiment of the present technology in a case where the light source blinks during a long-time exposure.

FIG. 12 is a timing diagram illustrating an example of exposure timing of the imaging device 100 according to the first embodiment of the present technology in a case where the light source blinks during a long-time exposure.

The imaging device 100 starts capturing a long-time exposure image at time point T21 at which the vertical synchronization signal VSYNC rises. Subsequently, at time point T23, the imaging device 100 starts capturing a short-time exposure image. Incidentally, it is assumed that the light source is turned on for the exposure period for short-time exposure.

Here, it is assumed that the light source is turned off during a period between time point T21 at which exposure of the long-time exposure image starts and time point T22 during the period of that exposure, and that the light source is turned on at and after time point T22.

As described above, it is conceivable that the light source may blink during a long-time exposure. However, even if the light source blinks during a long-time exposure, a distinct brightness difference rarely occurs between the lines due to the long exposure period, and a portion with blinking of the light source is a gradation-like image instead of an edge image. Further, even if an edge arises, an error is unlikely to occur because long-time exposure low-frequency components are not multiplied by the exposure ratio. As a result, erroneous determination of a brightness change is unlikely to occur. For these reasons, there is less necessity to take measures against blinking of the light source during a long-time exposure. Consequently, the imaging device 100 does not detect edges in the long-time exposure low-frequency components.

It should be noted that, in a case where a problematic faulty image is generated during a long-time exposure due to blinking of the light source, the imaging device 100 may detect edges not only in short-time exposure low-frequency components but also in long-time exposure low-frequency components.

[Exemplary Operation of Imaging Device]

Figure 13:
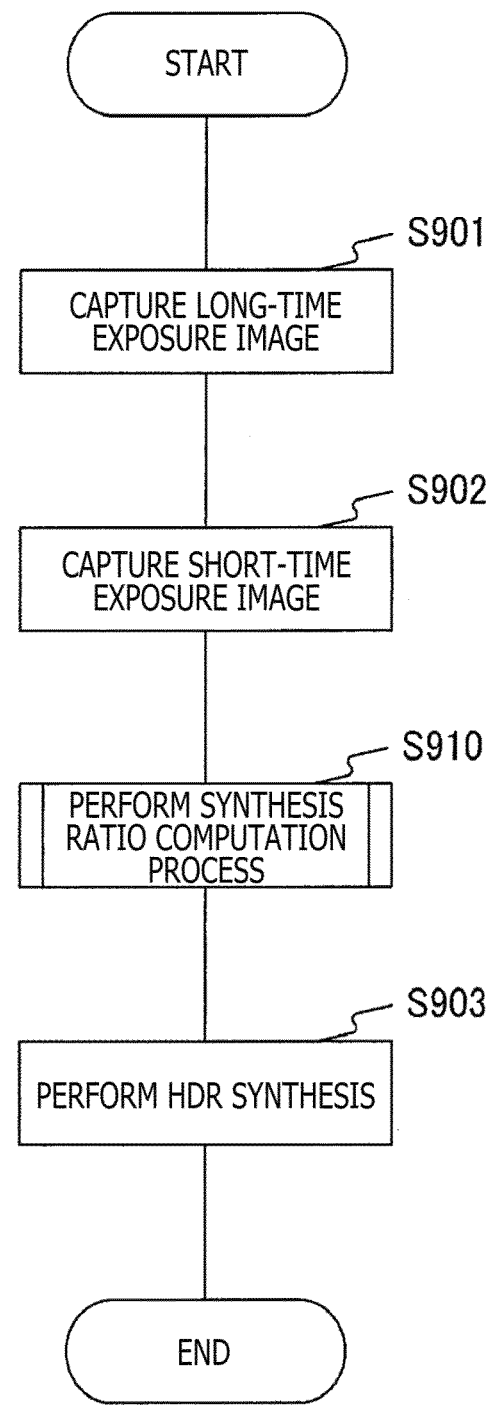
FIG. 13 is a flowchart illustrating an exemplary operation of the imaging device according to the first embodiment of the present technology.

FIG. 13 is a flowchart illustrating an exemplary operation of the imaging device 100 according to the first embodiment of the present technology. This operation starts when, for example, a predetermined application for obtaining an HDR synthesized image is executed.

The imaging device 100 first captures a long-time exposure image (step S901), and then captures a short-time exposure image (step S902). Further, the imaging device 100 performs a synthesis ratio computation process for computing the synthesis ratio (step S910). Subsequently, the imaging device 100 performs HDR synthesis at the computed synthesis ratio (step S903). After completion of step S903, the imaging device 100 ends the operation. In a case where a video including a plurality of HDR images is to be obtained, the imaging device 100 performs steps S901 to S903 repeatedly.

It should be noted that the imaging device 100 first captures a long-time exposure image and then captures a short-time exposure image but the imaging device 100 may first capture the short-time exposure image and then capture the long-time exposure image.

Figure 14:
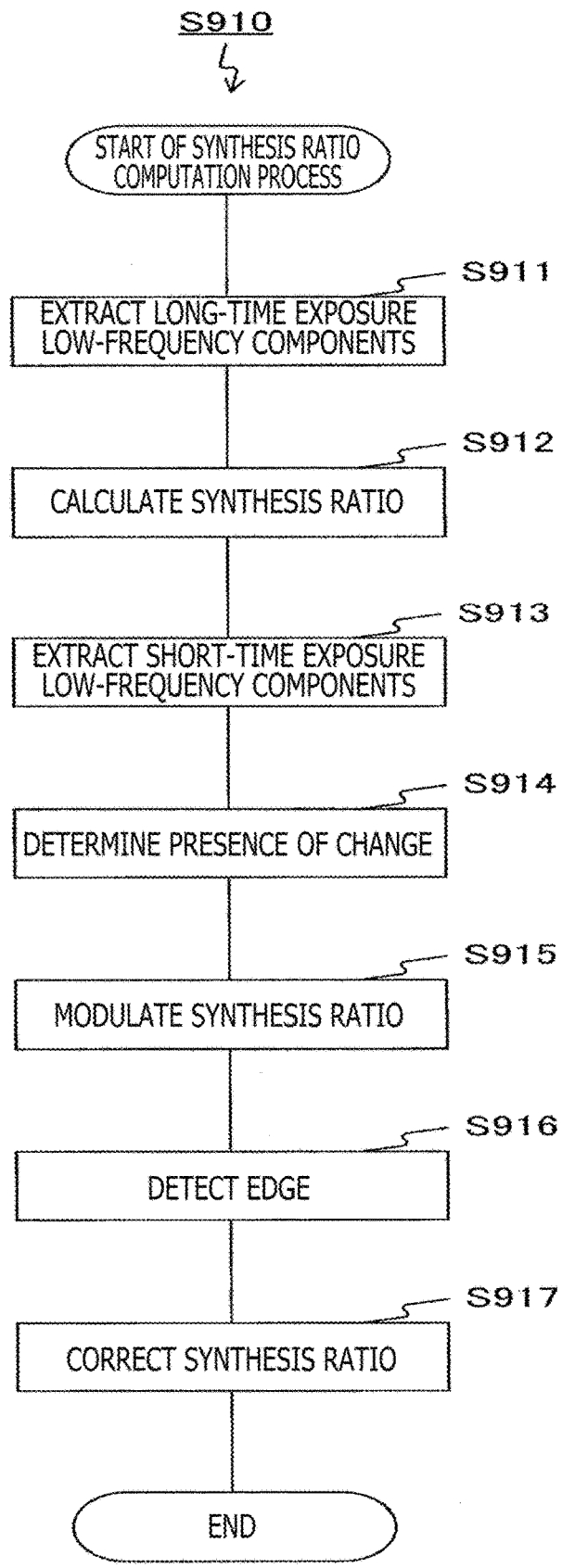
FIG. 14 is a flowchart illustrating an example of a synthesis ratio computation process in the first embodiment of the present technology.

FIG. 14 is a flowchart illustrating an example of the synthesis ratio computation process in the first embodiment of the present technology. The image processing section 300 in the imaging device 100 extracts long-time exposure low-frequency components from a long-time exposure image (step S911), and then calculates the synthesis ratio $R_O$ from the extracted components (step S912).

Further, the image processing section 300 extracts short-time exposure low-frequency components from a short-time exposure image (step S913). Then, on the basis of the long-time exposure low-frequency components and the short-time exposure low-frequency components, the image processing section 300 determines whether a brightness change is present (step S914), and modulates the synthesis ratio $R_O$ in accordance with the result of determination (step S915).

Subsequently, the image processing section 300 detects an edge along a line in the short-time exposure low-frequency components (step S916), and corrects the modulated synthesis ratio $R_{m1}$ in accordance with the result of detection (step S917). After completion of step S917, the image processing section 300 ends the synthesis ratio computation process.

Figure 15:
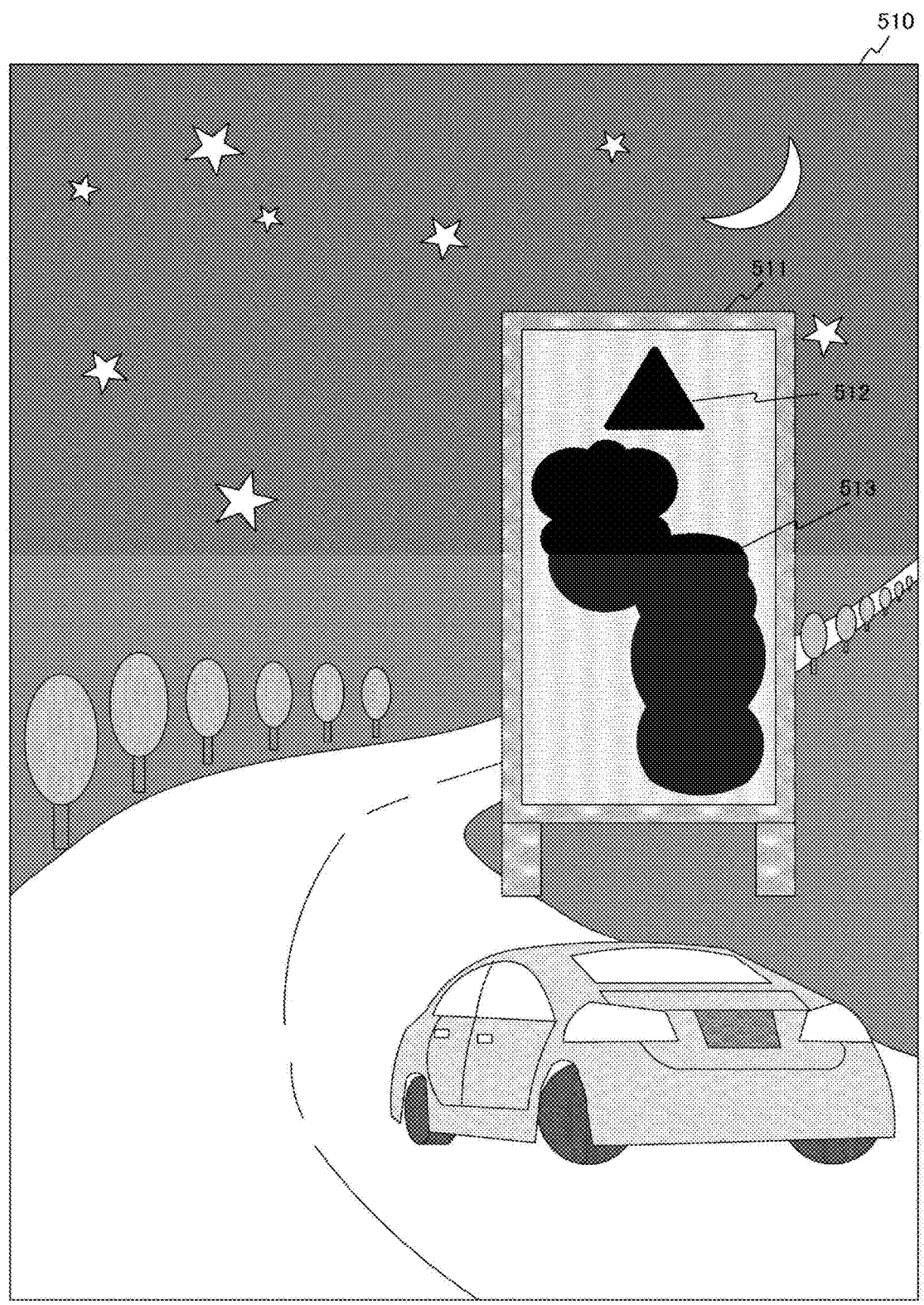
FIG. 15 is a diagram illustrating an example of an HDR synthesized image in a comparative example in which a brightness change is not determined.

FIG. 15 is a diagram illustrating an example of an HDR synthesized image 510 in a comparative example in which a brightness change is not to be determined. Objects depicted in this HDR synthesized image 510 include a signboard 511 that uses, for example, an LED. Blinking sections 512 and 513 of this signboard 511 are blinking on a periodic basis.

If the blinking sections 512 and 513 are turned off with respect to only one of two images targeted for synthesis in a case where the imaging device 100 does not determine the presence of a brightness change in the above-described imaging environment, the image with the blinking sections turned off may be subjected to the synthesis. As a result, portions of the HDR synthesized image 510 that correspond to the blinking sections 512 and 513 are blackened due to insufficient brightness. Meanwhile, a portion other than those corresponding to such light sources can be provided with an increased dynamic range as a result of HDR synthesis.

Figure 16:
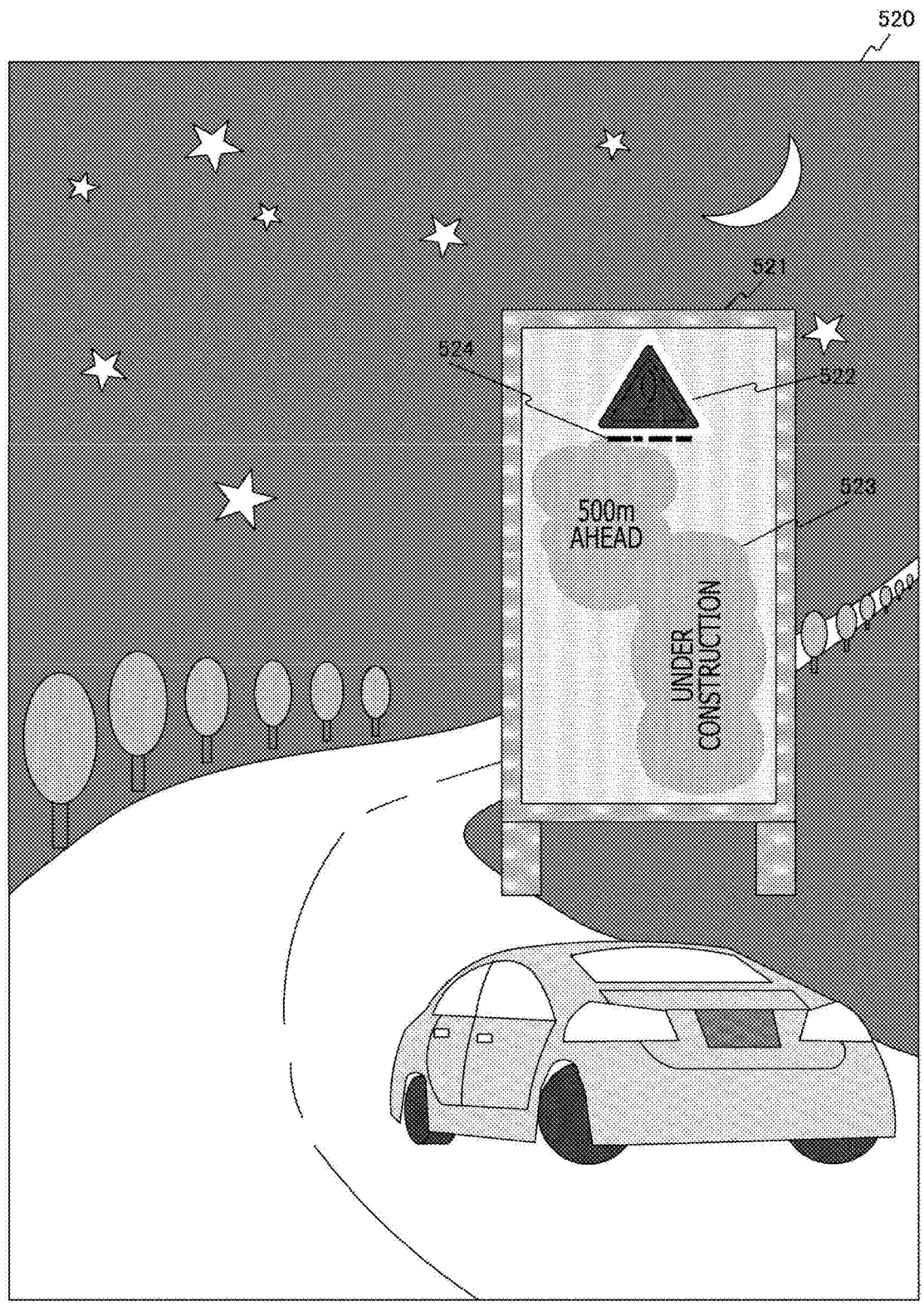
FIG. 16 is a diagram illustrating an example of the HDR synthesized image in a comparative example in which edge detection is not performed.

FIG. 16 is a diagram illustrating an example of an HDR synthesized image 520 in a comparative example in which edge detection is not performed although the presence of a brightness change is determined. Objects depicted in this HDR synthesized image 520 include a signboard 521 that uses, for example, an LED. Blinking sections 522 and 523 of this signboard 521 are blinking on a periodic basis. Even if the blinking sections 522 and 523 are turned off with respect to only one of two images targeted for synthesis, the image with the blinking sections turned on is preferentially subjected to the synthesis in accordance with the result of brightness change determination. This makes it possible to solve the problem of brightness insufficiency of the blinking sections 522, 523.

However, in a case where edge detection is not performed, a streaky artifact 524 arises along a line direction when the blinking sections 522 and 523 are turned off during the exposure period. This is because the imaging device 100 erroneously determines that no brightness change is present along a line with the blinking sections turned off, and then subjects the dark line with the blinking sections turned off to the synthesis.

Figure 17:
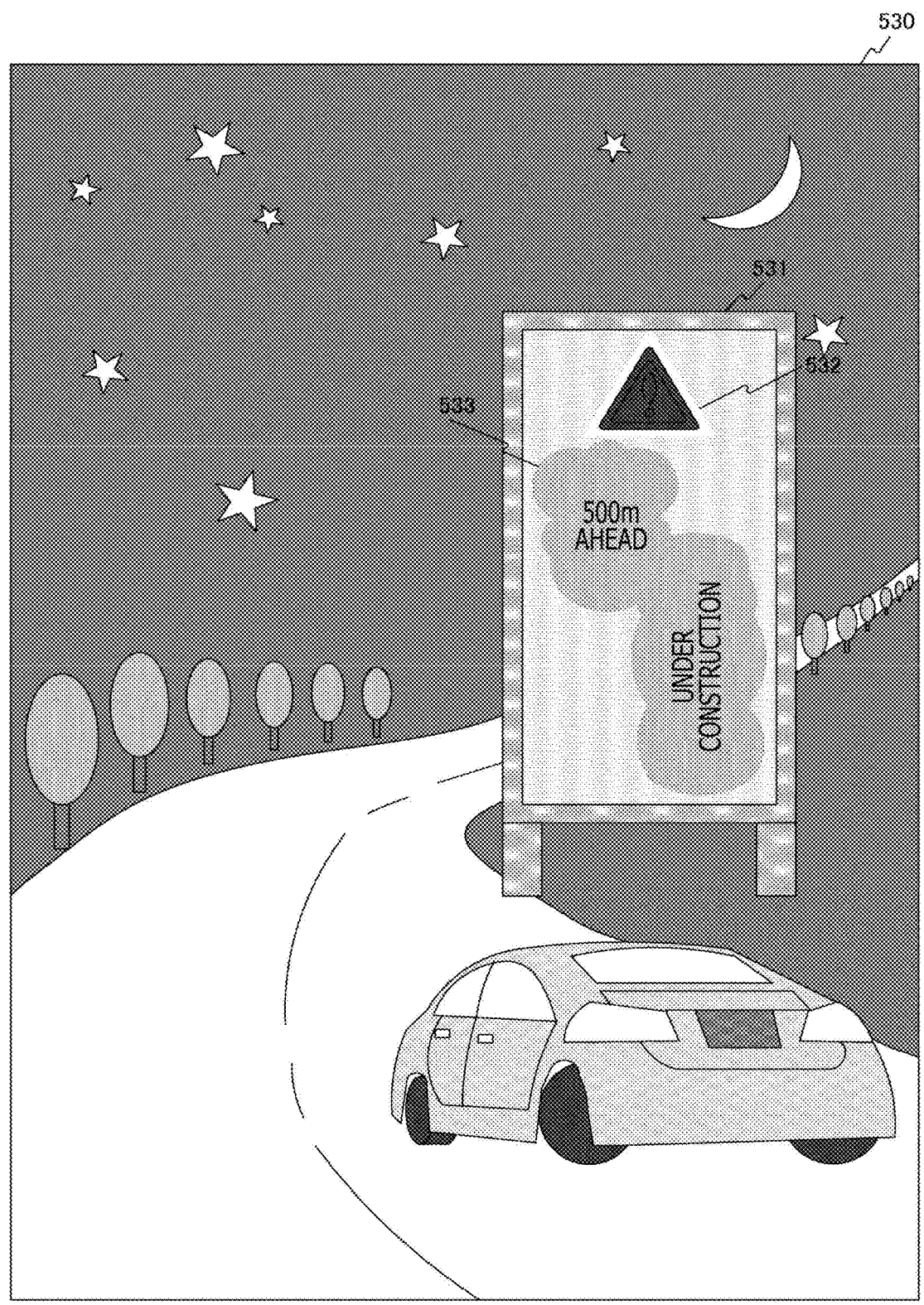
FIG. 17 is a diagram illustrating an example of the HDR synthesized image in the first embodiment of the present technology.

FIG. 17 is a diagram illustrating an example of an HDR synthesized image 530 in the first embodiment of the present technology. Objects depicted in this HDR synthesized image 530 include a signboard 531 that uses, for example, an LED. Blinking sections 532 and 533 of this signboard 531 are blinking on a periodic basis.

Even if the blinking sections 532 and 533 are turned off with respect to only one of two images targeted for synthesis, the image with the blinking sections turned on is preferentially subjected to the synthesis in accordance with the result of brightness change determination. This makes it possible to solve the problem of brightness insufficiency of the blinking sections 532 and 533.

Further, even if the blinking sections 532 and 533 blink during the exposure period of a short-time exposure image, a long-time exposure image is preferentially subjected to the synthesis because of edge detection. This makes it possible to suppress the generation of a streaky faulty image (artifact).

As described above, in a case where the light source blinks during the exposure period of a short-time exposure image, the first embodiment of the present technology causes the image processing section 300 to generate a synthesis ratio at which the percentage of the short-time exposure image is relatively low. This makes it possible to suppress the generation of a faulty image due to the synthesis of images with blinking of the light source. Consequently, the image quality of the HDR synthesized image can be improved.

First Exemplary Modification

In the first embodiment, which has been described above, the synthesis ratio correction section 370 corrects the synthesis ratio by using the subtractor 371. Alternatively, however, the synthesis ratio may be corrected by using a multiplier instead of the subtractor. A first exemplary modification of the first embodiment, which is described below, differs from the first embodiment in that the synthesis ratio correction section 370 corrects the synthesis ratio by using a multiplier.

Figure 18:
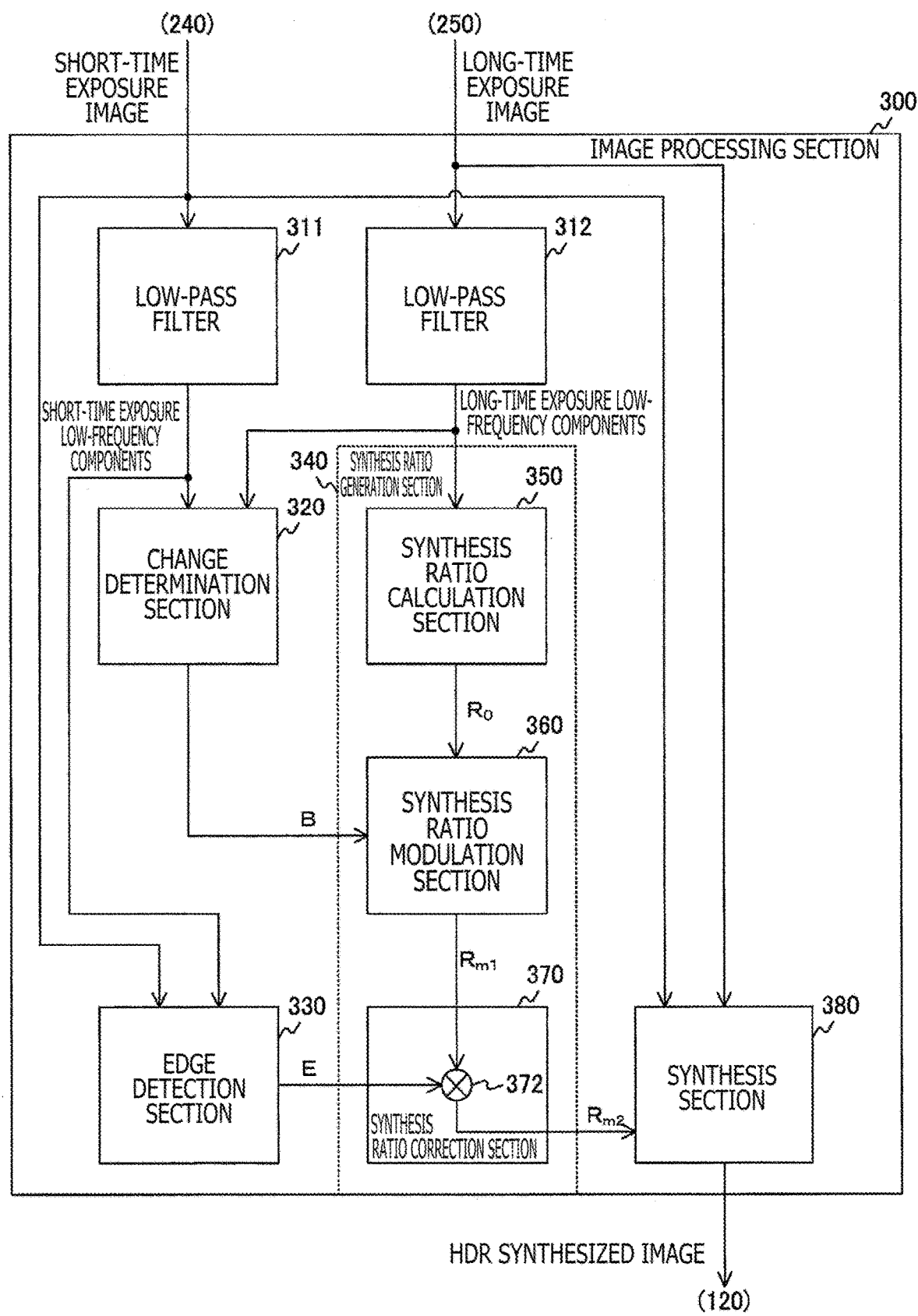
FIG. 18 is a block diagram illustrating an exemplary configuration of the image processing section in a first exemplary modification of the first embodiment of the present technology.

FIG. 18 is a block diagram illustrating an exemplary configuration of the image processing section 300 in the first exemplary modification of the first embodiment of the present technology. This image processing section 300 in the first exemplary modification of the first embodiment differs from the counterpart in the first embodiment in that the former includes a multiplier 372 instead of the subtractor 371. The synthesis ratio correction section 370 uses the multiplier 372 to perform a computation expressed by the following equation instead of Equation 2:

$$R_{m2} = R_{m1} \times E$$

Even in a case where the corrected synthesis ratio $R_{m2}$ is equal to or lower than zero when the edge detection result E is subtracted as described in conjunction with the first embodiment, the above equation makes it possible to obtain the synthesis ratio Rm2 that is higher than zero. For example, when subtraction is performed in a case where the uncorrected synthesis ratio $R_{m1}$ and the edge detection result E are both 0.5, the corrected synthesis ratio $R_{m2}$ is zero. However, the result of multiplication performed instead of subtraction is 0.25. Consequently, a short-time exposure image can be reflected to a certain extent in a synthesized image.

Figure 19:
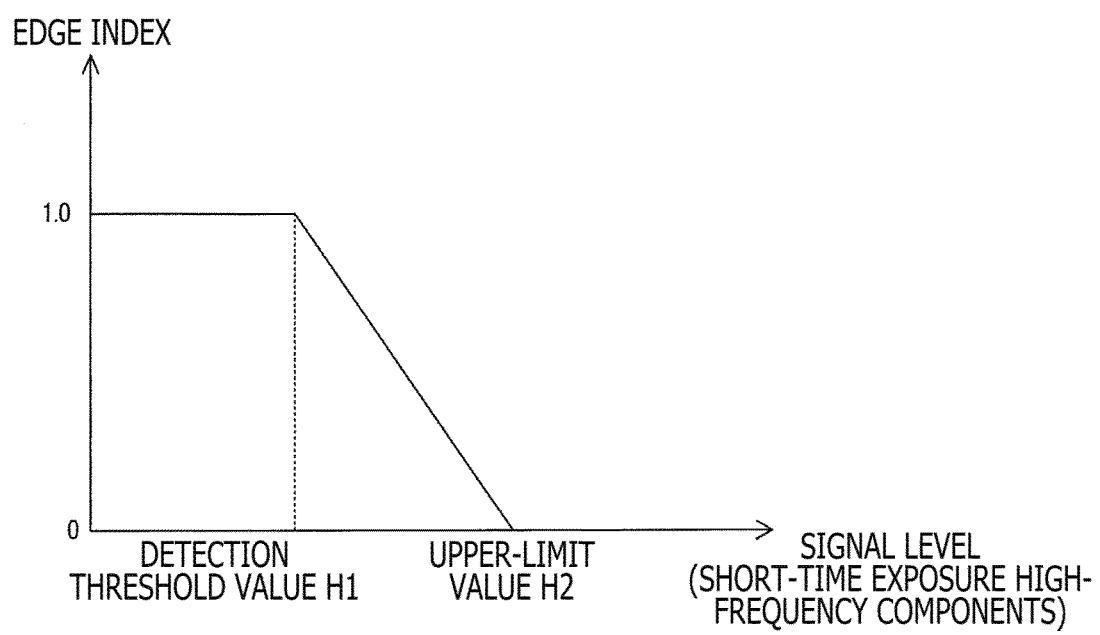
FIG. 19 is a graph illustrating an exemplary relationship between edge index and signal level in the first exemplary modification of the first embodiment of the present technology.

FIG. 19 is a graph illustrating an exemplary relationship between edge index and signal level in the first exemplary modification of the first embodiment of the present technology. In FIG. 19, the vertical axis represents the edge index, and the horizontal axis represents the signal level of a line in short-time exposure image high-frequency components. In a case where the signal level is equal to or lower than the detection threshold value H1, an edge index of "1" is outputted. Meanwhile, in a case where the signal level is higher than the detection threshold value H1 but equal to or lower than the upper-limit value H2, a value inversely proportional to the signal level is outputted as the edge index. Moreover, in a case where the differential signal is higher than the upper-limit value H2, an edge index of "0" is outputted.

As described above, the first exemplary modification of the first embodiment is configured so that the synthesis ratio correction section 370 corrects the synthesis ratio by using the multiplier 372. Consequently, the percentage of a short-time exposure image can be decreased for correction purposes by way of multiplication.

Second Exemplary Modification

In the first embodiment, which has been described above, the edge detection section 330 generates the short-time exposure high-frequency components by computing the difference between the short-time exposure low-frequency components passed through a low-pass filter and the short-time exposure image existing before being passed through the low-pass filter. Alternatively, however, the edge detection section 330 may generate the short-time exposure high-frequency components by using a high-pass filter. This edge detection section in a second exemplary modification of the first embodiment differs from the counterpart in the first embodiment in that a high-pass filter is used to generate the short-time exposure high-frequency components.

Figure 20:
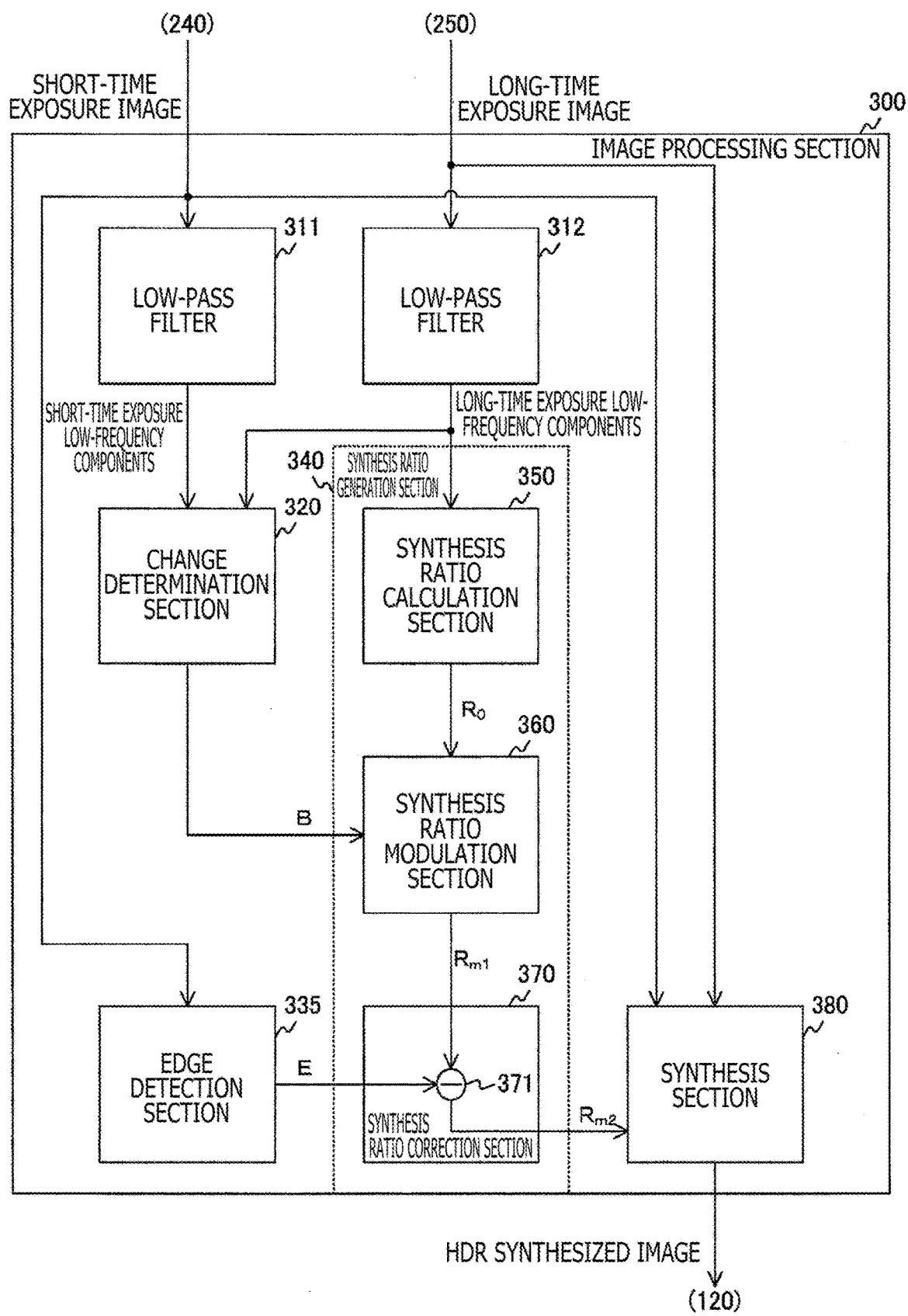
FIG. 20 is a block diagram illustrating an exemplary configuration of the image processing section in a second exemplary modification of the first embodiment of the present technology.

FIG. 20 is a block diagram illustrating an exemplary configuration of the image processing section 300 in the second exemplary modification of the first embodiment of the present technology. This image processing section 300 in the second exemplary modification of the first embodiment differs from the counterpart in the first embodiment in that the former includes an edge detection section 335 instead of the edge detection section 330. Further, the low-pass filter 311 outputs the short-time exposure low-frequency components only to the change determination section 320 and not to the edge detection section 335.

Figure 21:
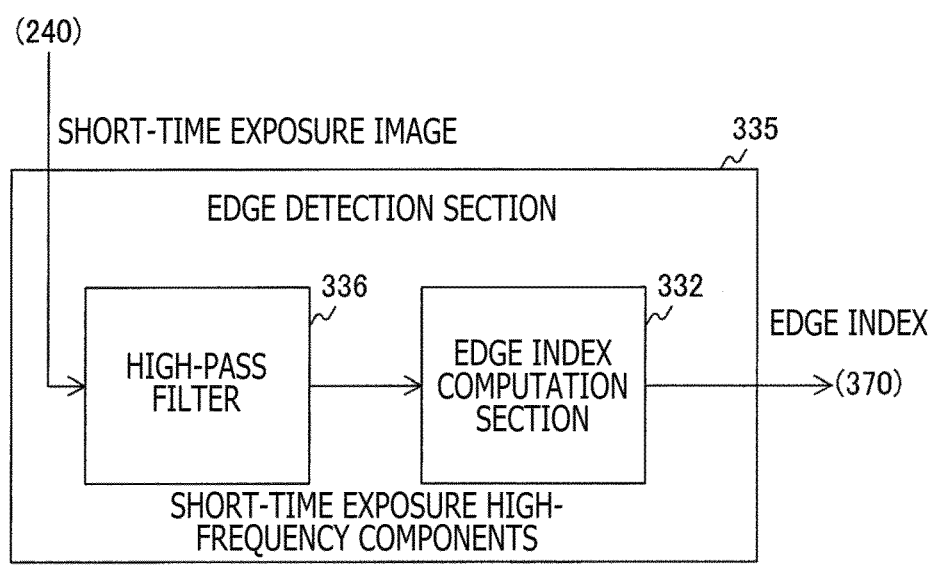
FIG. 21 is a block diagram illustrating an exemplary configuration of the edge detection section in the second exemplary modification of the first embodiment of the present technology.

FIG. 21 is a block diagram illustrating an exemplary configuration of the edge detection section 335 in the second exemplary modification of the first embodiment of the present technology. This edge detection section 335 in the second exemplary modification of the first embodiment includes a high-pass filter 336 and an edge index computation section 332.

The high-pass filter 336 passes, as short-time exposure high-frequency components, high-frequency components of a short-time exposure image that have a frequency higher than a predetermined frequency. This high-pass filter 336 outputs the short-time exposure high-frequency components to the edge index computation section 332. For example, a Laplacian filter is used as the high-pass filter 336.

Figure 22:
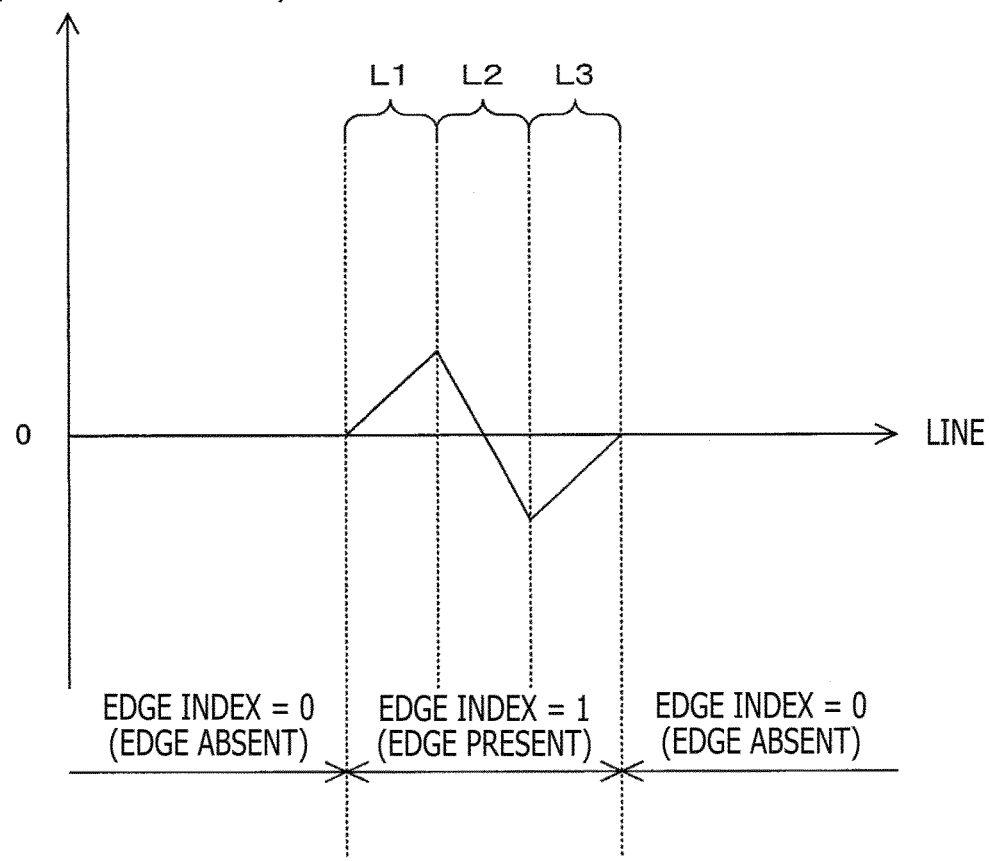
FIG. 22 is a graph illustrating an exemplary luminance level of each line in a short-time exposure high-frequency component in the second exemplary modification of the first embodiment of the present technology.

FIG. 22 is a graph illustrating an exemplary luminance level of each line in short-time exposure high-frequency components in the second exemplary modification of the first embodiment of the present technology. In FIG. 22, the vertical axis represents a luminance level, and the horizontal axis represents a line in the short-time exposure high-frequency components. As illustrated in FIG. 22, the sign of the luminance level of the short-time exposure high-frequency components inverts at an edge portion. In such an instance, attention is paid, for example, on a negative luminance level rather than a positive one, and the edge index computation section 332 in a subsequent stage outputs an edge index that increases with an increase in the absolute value of the negative luminance level.

It should be noted that the first exemplary modification of the first embodiment is applicable to the second exemplary modification of the first embodiment. In such a case, the edge index computation section 332 is only required to output an edge index that decreases with an increase in the absolute value of a negative luminance level.

As described above, the second exemplary modification of the first embodiment of the present technology is configured so that the edge detection section 335 generates high-frequency components by using the high-pass filter 336. Consequently, edge detection can be achieved without using the subtractor 331 that determines the difference between a signal passed through a low-pass filter and a signal not passed through the low-pass filter.

2. Second Embodiment

In the first embodiment, which has been described above, the image processing section 300 synthesizes two images. However, when the number of images to be synthesized is two, it might be difficult to improve the image quality of an HDR synthesized image. For example, if the exposure ratio is increased in order to further increase the dynamic range, blown-out highlights, blocked-up shadows, or other flaws are likely to occur. In general, increasing the number of images to be synthesized realizes rich gradation expression and reduces noise, thereby improving image quality. This image processing section 300 in a second embodiment of the present technology differs from the counterpart in the first embodiment in that the number of images to be synthesized is increased.

Figure 23:
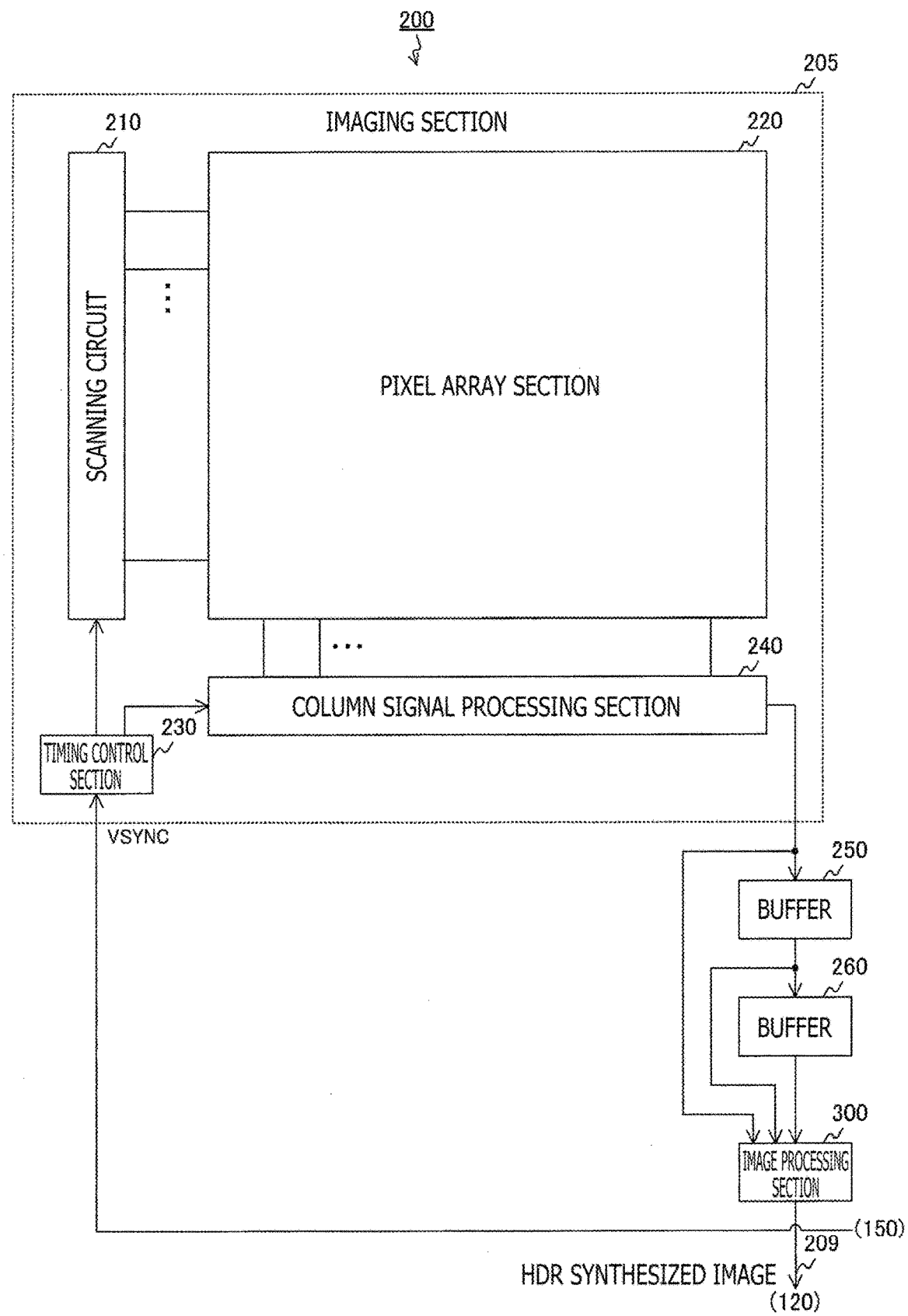
FIG. 23 is a block diagram illustrating an exemplary configuration of the solid-state imaging element in a second embodiment of the present technology.

FIG. 23 is a block diagram illustrating an exemplary configuration of the solid-state imaging element 200 in the second embodiment of the present technology. This solid-state imaging element 200 in the second embodiment differs from the counterpart in the first embodiment in that the former additionally includes a buffer 260.

The buffer 260 retains and delays a predetermined number of line data. The buffer 260 supplies each of the delayed line data to the image processing section 300.

Meanwhile, the buffer 250 in the second embodiment supplies each of the delayed line data to the buffer 260 and the image processing section 300. The imaging section 205 sequentially captures three images that differ in exposure period. Among the three images, an image with the longest exposure time is hereinafter referred to as the "long-time exposure image," an image with the second longest exposure time is hereinafter referred to as the "medium-time exposure image," and an image with the shortest exposure time is hereinafter referred to as the "short-time exposure image." It should be noted that the long-time exposure image is an example of a first image defined by the appended claims, and that the medium-time exposure image is an example of a second image defined by the appended claims, and further that the short-time exposure image is an example of a third image defined by the appended claims.

Figure 24:
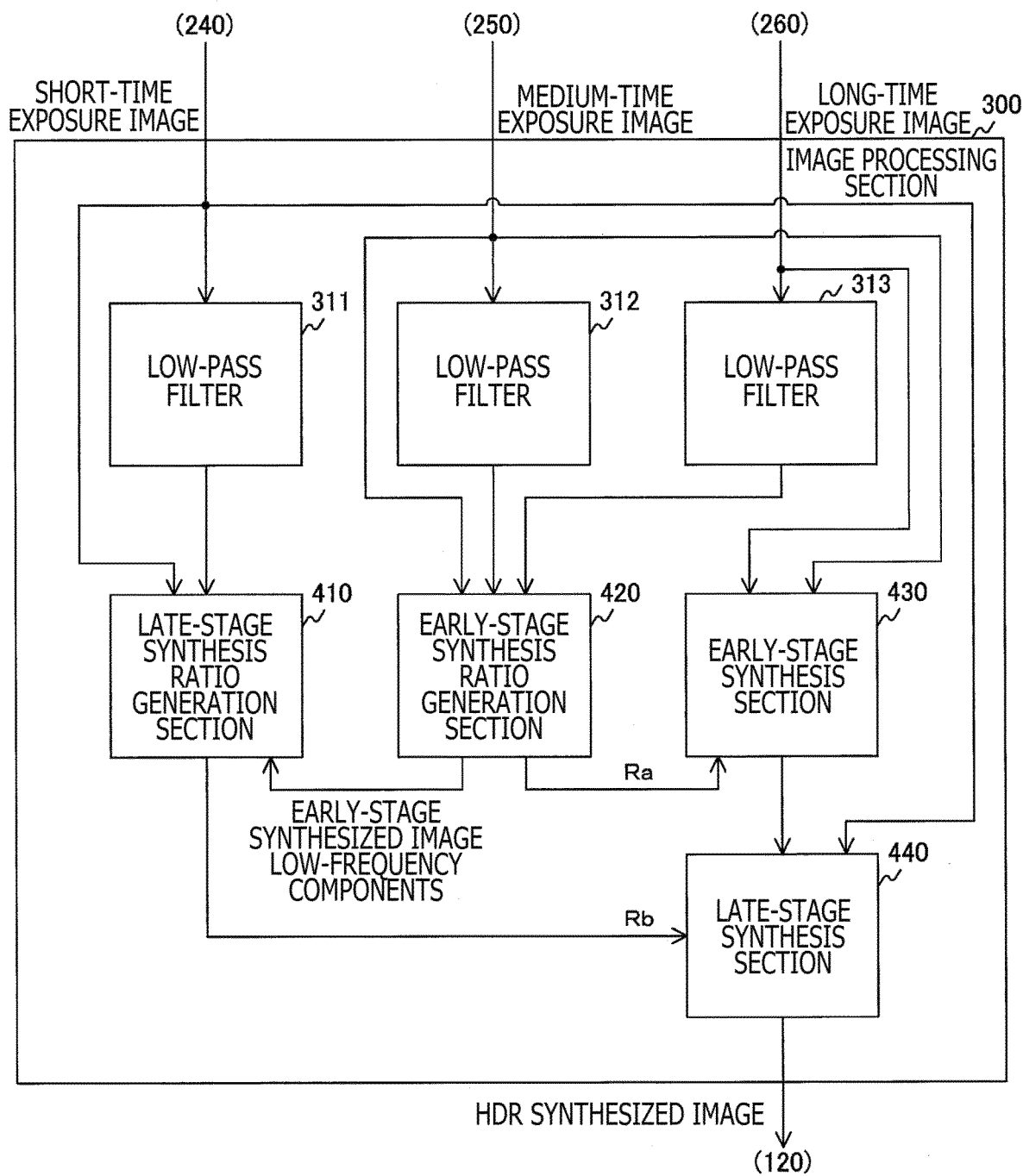
FIG. 24 is a block diagram illustrating an exemplary configuration of the image processing section in the second embodiment of the present technology.

FIG. 24 is a block diagram illustrating an exemplary configuration of the image processing section 300 in the second embodiment of the present technology. This image processing section 300 in the second embodiment includes low-pass filters 311, 312, and 313, a late-stage synthesis ratio computation section 410, an early-stage synthesis ratio computation section 420, an early-stage synthesis section 430, and a late-stage synthesis section 440.

The low-pass filter 311 passes low-frequency components of a short-time exposure image that have a frequency lower than a predetermined frequency. This low-pass filter 311 outputs the low-frequency components to the late-stage synthesis ratio computation section 410 as short-time exposure low-frequency components.

The low-pass filter 312 passes low-frequency components of a medium-time exposure image that have a frequency lower than a predetermined frequency. This low-pass filter 312 supplies the low-frequency components to the early-stage synthesis ratio computation section 420 as medium-time exposure low-frequency components.

The low-pass filter 313 passes low-frequency components of a long-time exposure image that have a frequency lower than a predetermined frequency. This low-pass filter 313 supplies the low-frequency components to the early-stage synthesis ratio computation section 420 as long-time exposure low-frequency components.

The early-stage synthesis ratio computation section 420 computes an early-stage synthesis ratio Ra on the basis of the medium-time exposure image, the medium-time exposure low-frequency components, and the long-time exposure low-frequency components. This early-stage synthesis ratio computation section 420 supplies the computed early-stage synthesis ratio Ra to the early-stage synthesis section 430. Further, the early-stage synthesis ratio computation section 420 synthesizes the medium-time exposure low-frequency components and the long-time exposure low-frequency components to obtain early-stage synthesized image low-frequency components, and supplies the early-stage synthesized image low-frequency components to the late-stage synthesis ratio computation section 410.

The late-stage synthesis ratio computation section 410 computes a late-stage synthesis ratio Rb on the basis of the short-time exposure image, the short-time exposure low-frequency components, and the early-stage synthesized image low-frequency components. This late-stage synthesis ratio computation section 410 supplies the computed late-stage synthesis ratio Rb to the late-stage synthesis section 440.

The early-stage synthesis section 430 synthesizes the long-time exposure image and the medium-time exposure image at the early-stage synthesis ratio Ra. This early-stage synthesis section 430 supplies the synthesized image to the late-stage synthesis section 440 as an early-stage synthesized image.

The late-stage synthesis section 440 synthesizes the early-stage synthesized image and the short-time exposure image at the late-stage synthesis ratio Rb. This early-stage synthesis section 440 supplies the synthesized image to the DSP circuit 120 as an HDR synthesized image.

It should be noted that the image processing section 300 synthesizes three images but the number of images to be synthesized is not limited to three and the image processing section 300 may synthesize four or more images. In a case where four or more images are to be synthesized, circuits having the same configuration as the late-stage synthesis ratio computation section 410 and the late-stage synthesis section 440 as well as programs are added as needed in accordance with the number of images to be synthesized.

Figure 25:
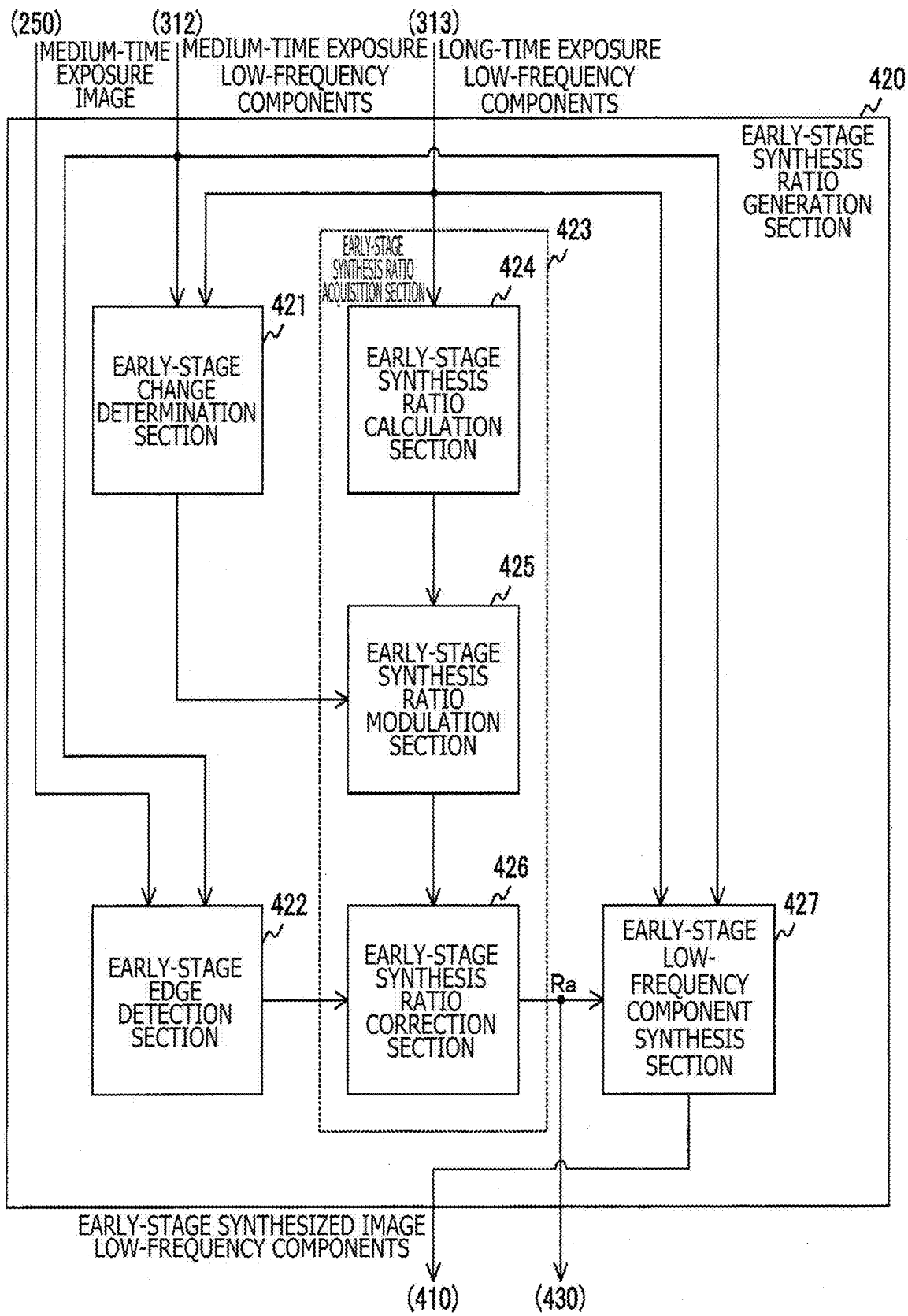
FIG. 25 is a block diagram illustrating an exemplary configuration of an early-stage synthesis ratio computation section in the second embodiment of the present technology.

FIG. 25 is a block diagram illustrating an exemplary configuration of the early-stage synthesis ratio computation section 420 in the second embodiment of the present technology. This early-stage synthesis ratio computation section 420 includes an early-stage change determination section 421, an early-stage edge detection section 422, an early-stage synthesis ratio generation section 423, and an early-stage low-frequency component synthesis section 427. The early-stage synthesis ratio generation section 423 includes an early-stage synthesis ratio calculation section 424, an early-stage synthesis ratio modulation section 425, and an early-stage synthesis ratio correction section 426.

The early-stage change determination section 421 checks each line to determine, on the basis of the long-time exposure low-frequency components and the medium-time exposure low-frequency components, whether a brightness change is present between the long-time exposure image and the medium-time exposure image. This early-stage change determination section 421 supplies the result of determination to the early-stage synthesis ratio modulation section 425. It should be noted that the early-stage change determination section 421 is an example of an early-stage determination section defined by the appended claims.

The early-stage edge detection section 422 detects, on the basis of the medium-time exposure image and the medium-time exposure low-frequency components, whether an edge is present along a line in the medium-time exposure image. This early-stage edge detection section 422 supplies the result of detection to the early-stage synthesis ratio correction section 426. It should be noted that the early-stage edge detection section 422 is an example of an early-stage detection section defined by the appended claims.

For each pixel in the long-time exposure low-frequency components, the early-stage synthesis ratio calculation section 424 calculates the synthesis ratio based on pixel brightness. The early-stage synthesis ratio calculation section 424 outputs the calculated synthesis ratio to the early-stage synthesis ratio modulation section 425.

The early-stage synthesis ratio modulation section 425 modulates the synthesis ratio of each pixel in accordance with the result of brightness change determination. This early-stage synthesis ratio modulation section 425 supplies the modulated synthesis ratio to the early-stage synthesis ratio correction section 426.

The early-stage synthesis ratio correction section 426 corrects the synthesis ratio of each pixel in accordance with the result of edge detection. This early-stage synthesis ratio correction section 426 supplies the corrected synthesis ratio, as the early-stage synthesis ratio Ra, to the early-stage low-frequency component synthesis section 427 and the early-stage synthesis section 430.

The early-stage low-frequency component synthesis section 427 synthesizes the medium-time exposure low-frequency components and the long-time exposure low-frequency components at the early-stage synthesis ratio Ra, and supplies the synthesized low-frequency components to the late-stage synthesis ratio computation section 410 as the early-stage synthesized image low-frequency components.

Figure 26:
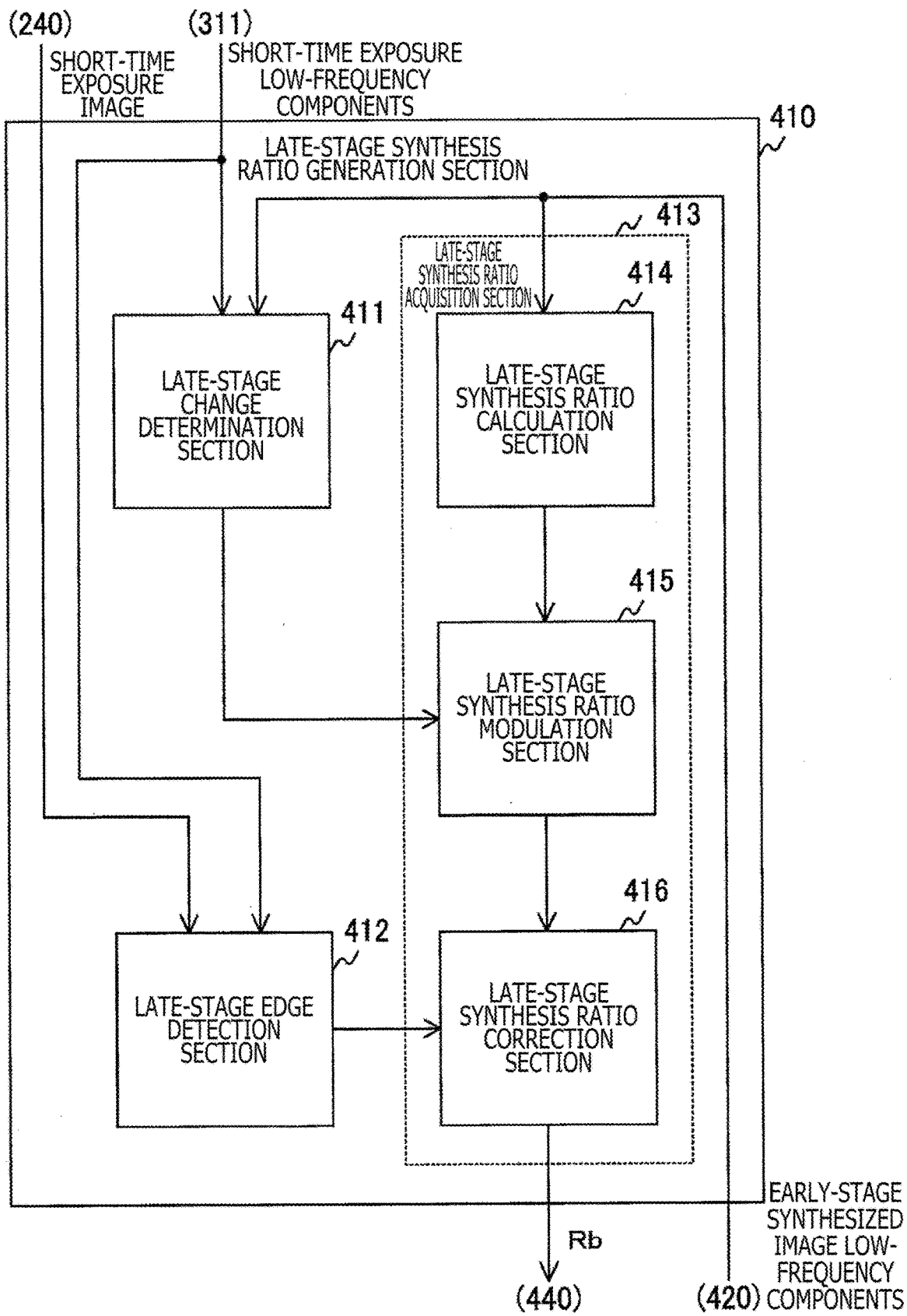
FIG. 26 is a block diagram illustrating an exemplary configuration of a late-stage synthesis ratio computation section in the second embodiment of the present technology.

FIG. 26 is a block diagram illustrating an exemplary configuration of the late-stage synthesis ratio computation section 410 in the second embodiment of the present technology. This late-stage synthesis ratio computation section 410 includes a late-stage change determination section 411, a late-stage edge detection section 412, and a late-stage synthesis ratio generation section 413. The late-stage synthesis ratio generation section 413 includes a late-stage synthesis ratio calculation section 414, a late-stage synthesis ratio modulation section 415, and a late-stage synthesis ratio correction section 416.

The late-stage change determination section 411 checks each pixel to determine, on the basis of the short-time exposure low-frequency components and the early-stage synthesized image low-frequency components, whether a brightness change is present between the short-time exposure image and the early-stage synthesized image. This late-stage change determination section 411 supplies the result of determination to the late-stage synthesis ratio modulation section 415. It should be noted that the late-stage change determination section 411 is an example of a late-stage determination section defined by the appended claims.

The late-stage edge detection section 412 detects, on the basis of the short-time exposure image and the short-time exposure low-frequency components, whether an edge is present along a line in the short-time exposure image. This late-stage edge detection section 412 supplies the result of detection to the late-stage synthesis ratio correction section 416. It should be noted that the late-stage edge detection section 412 is an example of a late-stage detection section defined by the appended claims.

For each pixel in the early-stage synthesized image low-frequency components, the late-stage synthesis ratio calculation section 414 calculates the synthesis ratio based on pixel brightness. This late-stage synthesis ratio calculation section 414 outputs the calculated synthesis ratio to the late-stage synthesis ratio modulation section 415.

The late-stage synthesis ratio modulation section 415 modulates the synthesis ratio of each pixel in accordance with the result of brightness change determination. This late-stage synthesis ratio modulation section 415 supplies the modulated synthesis ratio to the late-stage synthesis ratio correction section 416.

The late-stage synthesis ratio correction section 416 corrects the synthesis ratio of each pixel in accordance with the result of edge detection. This late-stage synthesis ratio correction section 416 supplies the corrected synthesis ratio to the late-stage synthesis section 440 as the late-stage synthesis ratio Rb.

As described above, the second embodiment of the present technology synthesizes three images that differ in exposure period. Consequently, the image quality of an HDR synthesized image can be further improved as compared to a case where two images are synthesized.

3. Exemplary Applications to Mobile Body

The technology according to the present disclosure (the present technology) is applicable to various products. For example, the technology according to the present disclosure may be implemented as a device that is to be mounted in one of various types of mobile bodies such as automobiles, electric automobiles, hybrid electric automobiles, motorcycles, bicycles, personal mobility devices, airplanes, drones, ships, and robots.

Figure 27:
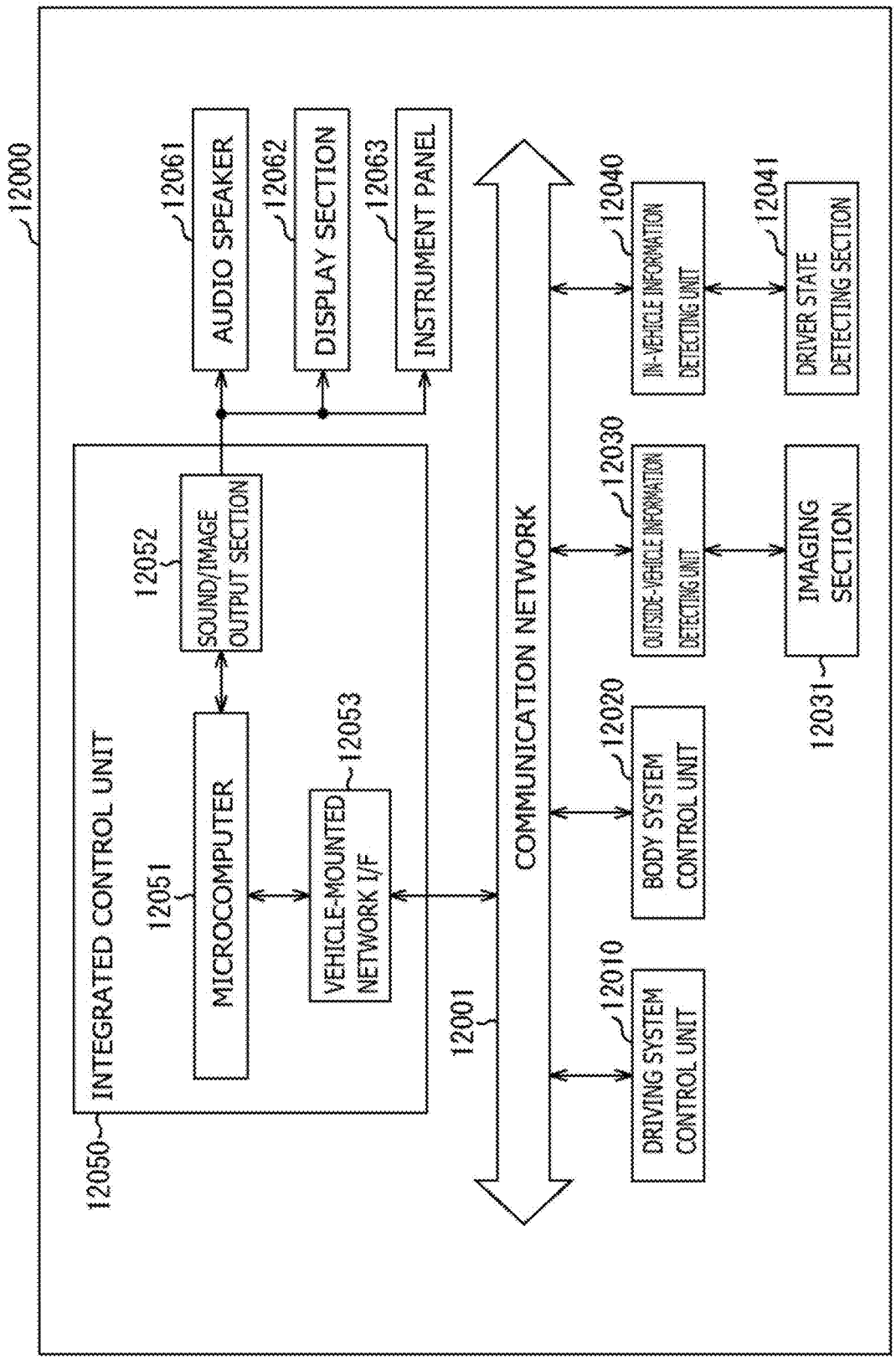
FIG. 27 is a block diagram depicting an example of schematic configuration of a vehicle control system.

FIG. 27 is a block diagram depicting an example of schematic configuration of a vehicle control system as an example of a mobile body control system to which the technology according to an embodiment of the present disclosure can be applied.

The vehicle control system 12000 includes a plurality of electronic control units connected to each other via a communication network 12001. In the example depicted in FIG. 27, the vehicle control system 12000 includes a driving system control unit 12010, a body system control unit 12020, an outside-vehicle information detecting unit 12030, an in-vehicle information detecting unit 12040, and an integrated control unit 12050. In addition, a microcomputer 12051, a sound/image output section 12052, and a vehicle-mounted network interface (I/F) 12053 are illustrated as a functional configuration of the integrated control unit 12050.

The driving system control unit 12010 controls the operation of devices related to the driving system of the vehicle in accordance with various kinds of programs. For example, the driving system control unit 12010 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like.

The body system control unit 12020 controls the operation of various kinds of devices provided to a vehicle body in accordance with various kinds of programs. For example, the body system control unit 12020 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 12020. The body system control unit 12020 receives these input radio waves or signals, and controls a door lock device, the power window device, the lamps, or the like of the vehicle.

The outside-vehicle information detecting unit 12030 detects information about the outside of the vehicle including the vehicle control system 12000. For example, the outside-vehicle information detecting unit 12030 is connected with an imaging section 12031. The outside-vehicle information detecting unit 12030 makes the imaging section 12031 image an image of the outside of the vehicle, and receives the imaged image. On the basis of the received image, the outside-vehicle information detecting unit 12030 may perform processing of detecting an object such as a human, a vehicle, an obstacle, a sign, a character on a road surface, or the like, or processing of detecting a distance thereto.

The imaging section 12031 is an optical sensor that receives light, and which outputs an electric signal corresponding to a received light amount of the light. The imaging section 12031 can output the electric signal as an image, or can output the electric signal as information about a measured distance. In addition, the light received by the imaging section 12031 may be visible light, or may be invisible light such as infrared rays or the like.

The in-vehicle information detecting unit 12040 detects information about the inside of the vehicle. The in-vehicle information detecting unit 12040 is, for example, connected with a driver state detecting section 12041 that detects the state of a driver. The driver state detecting section 12041, for example, includes a camera that images the driver. On the basis of detection information input from the driver state detecting section 12041, the in-vehicle information detecting unit 12040 may calculate a degree of fatigue of the driver or a degree of concentration of the driver, or may determine whether the driver is dozing.

The microcomputer 12051 can calculate a control target value for the driving force generating device, the steering mechanism, or the braking device on the basis of the information about the inside or outside of the vehicle which information is obtained by the outside-vehicle information detecting unit 12030 or the in-vehicle information detecting unit 12040, and output a control command to the driving system control unit 12010. For example, the microcomputer 12051 can perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like.

In addition, the microcomputer 12051 can perform cooperative control intended for automatic driving, which makes the vehicle to travel autonomously without depending on the operation of the driver, or the like, by controlling the driving force generating device, the steering mechanism, the braking device, or the like on the basis of the information about the outside or inside of the vehicle which information is obtained by the outside-vehicle information detecting unit 12030 or the in-vehicle information detecting unit 12040.

In addition, the microcomputer 12051 can output a control command to the body system control unit 12020 on the basis of the information about the outside of the vehicle which information is obtained by the outside-vehicle information detecting unit 12030. For example, the microcomputer 12051 can perform cooperative control intended to prevent a glare by controlling the headlamp so as to change from a high beam to a low beam, for example, in accordance with the position of a preceding vehicle or an oncoming vehicle detected by the outside-vehicle information detecting unit 12030.

The sound/image output section 12052 transmits an output signal of at least one of a sound and an image to an output device capable of visually or auditorily notifying information to an occupant of the vehicle or the outside of the vehicle. In the example of FIG. 27, an audio speaker 12061, a display section 12062, and an instrument panel 12063 are illustrated as the output device. The display section 12062 may, for example, include at least one of an on-board display and a head-up display.

Figure 28:
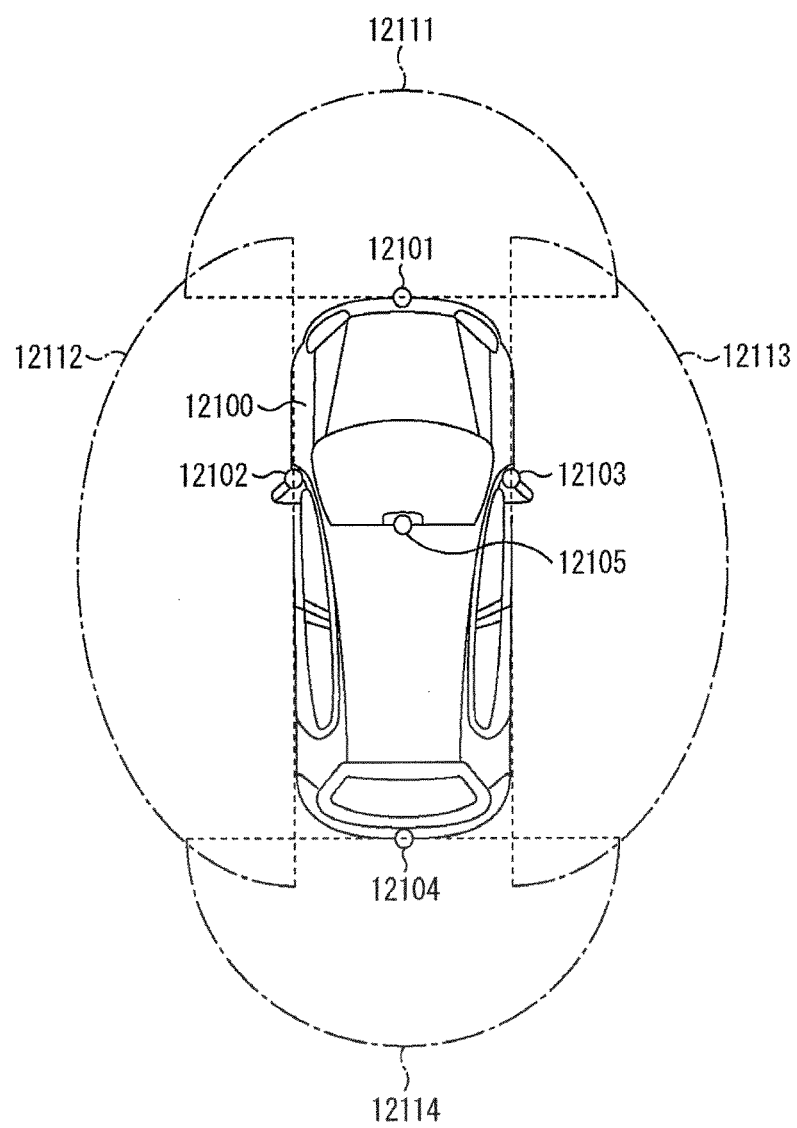
FIG. 28 is a diagram of assistance in explaining an example of installation positions of an outside-vehicle information detecting section and an imaging section.

FIG. 28 is a diagram depicting an example of the installation position of the imaging section 12031.

In FIG. 28, the imaging section 12031 includes imaging sections 12101, 12102, 12103, 12104, and 12105.

The imaging sections 12101, 12102, 12103, 12104, and 12105 are, for example, disposed at positions on a front nose, sideview mirrors, a rear bumper, and a back door of the vehicle 12100 as well as a position on an upper portion of a windshield within the interior of the vehicle. The imaging section 12101 provided to the front nose and the imaging section 12105 provided to the upper portion of the windshield within the interior of the vehicle obtain mainly an image of the front of the vehicle 12100. The imaging sections 12102 and 12103 provided to the sideview mirrors obtain mainly an image of the sides of the vehicle 12100. The imaging section 12104 provided to the rear bumper or the back door obtains mainly an image of the rear of the vehicle 12100. The imaging section 12105 provided to the upper portion of the windshield within the interior of the vehicle is used mainly to detect a preceding vehicle, a pedestrian, an obstacle, a signal, a traffic sign, a lane, or the like.

Incidentally, FIG. 28 depicts an example of photographing ranges of the imaging sections 12101 to 12104. An imaging range 12111 represents the imaging range of the imaging section 12101 provided to the front nose. Imaging ranges 12112 and 12113 respectively represent the imaging ranges of the imaging sections 12102 and 12103 provided to the sideview mirrors. An imaging range 12114 represents the imaging range of the imaging section 12104 provided to the rear bumper or the back door. A bird's-eye image of the vehicle 12100 as viewed from above is obtained by superimposing image data imaged by the imaging sections 12101 to 12104, for example.

At least one of the imaging sections 12101 to 12104 may have a function of obtaining distance information. For example, at least one of the imaging sections 12101 to 12104 may be a stereo camera constituted of a plurality of imaging elements, or may be an imaging element having pixels for phase difference detection.

For example, the microcomputer 12051 can determine a distance to each three-dimensional object within the imaging ranges 12111 to 12114 and a temporal change in the distance (relative speed with respect to the vehicle 12100) on the basis of the distance information obtained from the imaging sections 12101 to 12104, and thereby extract, as a preceding vehicle, a nearest three-dimensional object in particular that is present on a traveling path of the vehicle 12100 and which travels in substantially the same direction as the vehicle 12100 at a predetermined speed (for example, equal to or more than 0 km/hour). Further, the microcomputer 12051 can set a following distance to be maintained in front of a preceding vehicle in advance, and perform automatic brake control (including following stop control), automatic acceleration control (including following start control), or the like. It is thus possible to perform cooperative control intended for automatic driving that makes the vehicle travel autonomously without depending on the operation of the driver or the like.

For example, the microcomputer 12051 can classify three-dimensional object data on three-dimensional objects into three-dimensional object data of a two-wheeled vehicle, a standard-sized vehicle, a large-sized vehicle, a pedestrian, a utility pole, and other three-dimensional objects on the basis of the distance information obtained from the imaging sections 12101 to 12104, extract the classified three-dimensional object data, and use the extracted three-dimensional object data for automatic avoidance of an obstacle. For example, the microcomputer 12051 identifies obstacles around the vehicle 12100 as obstacles that the driver of the vehicle 12100 can recognize visually and obstacles that are difficult for the driver of the vehicle 12100 to recognize visually. Then, the microcomputer 12051 determines a collision risk indicating a risk of collision with each obstacle. In a situation in which the collision risk is equal to or higher than a set value and there is thus a possibility of collision, the microcomputer 12051 outputs a warning to the driver via the audio speaker 12061 or the display section 12062, and performs forced deceleration or avoidance steering via the driving system control unit 12010. The microcomputer 12051 can thereby assist in driving to avoid collision.

At least one of the imaging sections 12101 to 12104 may be an infrared camera that detects infrared rays. The microcomputer 12051 can, for example, recognize a pedestrian by determining whether or not there is a pedestrian in imaged images of the imaging sections 12101 to 12104. Such recognition of a pedestrian is, for example, performed by a procedure of extracting characteristic points in the imaged images of the imaging sections 12101 to 12104 as infrared cameras and a procedure of determining whether or not it is the pedestrian by performing pattern matching processing on a series of characteristic points representing the contour of the object. When the microcomputer 12051 determines that there is a pedestrian in the imaged images of the imaging sections 12101 to 12104, and thus recognizes the pedestrian, the sound/image output section 12052 controls the display section 12062 so that a square contour line for emphasis is displayed so as to be superimposed on the recognized pedestrian. The sound/image output section 12052 may also control the display section 12062 so that an icon or the like representing the pedestrian is displayed at a desired position.

The above description relates to an example of the vehicle control system to which the technology according to the present disclosure is applicable. The technology according to the present disclosure is applicable, for example, to the imaging section 12031, which is included in the above-described configuration. More specifically, the solid-state imaging element 200 depicted in FIG. 2 is applicable to the imaging section 12031 depicted in FIG. 27. When the technology according to the present disclosure is applied to the imaging section 12031, captured images are easier to view. This makes it possible to reduce the fatigue of a vehicle driver.

The foregoing embodiments are exemplary embodiments of the present technology. There is a correspondence relationship between matters described in conjunction with the embodiments and invention-specifying matters defined by the appended claims. Similarly, there is a correspondence relationship between the invention-specifying matters defined by the appended claims and matters described in conjunction with the embodiments and assigned the same names as the invention-specifying matters. It should be noted, however, that the present technology is not limited to the embodiments and can be embodied by variously modifying the embodiments without departing from its spirit and scope.

Further, processing steps described in conjunction with the foregoing embodiments may be interpreted as a method including such a series of steps or may be interpreted as a program for causing a computer to execute such a series of steps or as a recording medium storing the program. This recording medium to be used may be, for example, a CD (Compact Disc), an MD (MiniDisc), a DVD (Digital Versatile Disc), a memory card, a Blu-ray (registered trademark) disc, or the like.

It should be noted that the advantages described in this document are merely illustrative and not restrictive. Further, the present technology can provide additional advantages.

It should be noted that the present technology may also adopt the following configurations.

(1)

An image processing device including:

a detection section that detects whether a light source has blinked during an exposure period of a detection target image among a plurality of images captured in chronological order, and outputs a detection result;

a synthesis ratio generation section that, in a case where the detection result indicates that the light source has blinked, generates a synthesis ratio for making the percentage of the detection target image lower than the percentage of an image other than the detection target image; and a synthesis section that synthesizes the plurality of images at the synthesis ratio.

(2)

The image processing device according to (1) above, further including:

a determination section that determines whether a brightness change is present between the plurality of images, and outputs a determination result, in which the synthesis ratio generation section generates the synthesis ratio on a basis of the determination result and the detection result.

(3)

The image processing device according to (2) above, in which the synthesis ratio generation section includes:

a synthesis ratio calculation section that calculates a predetermined synthesis ratio;

a synthesis ratio modulation section that modulates the calculated synthesis ratio in accordance with the determination result; and a synthesis ratio correction section that, in the case where the detection result indicates that the light source has blinked, corrects the modulated synthesis ratio so as to make the percentage of the detection target image lower than the percentage of the image other than the detection target image, and the synthesis section synthesizes the plurality of images at the corrected synthesis ratio.

(4)

The image processing device according to (3) above, further including:

a low-pass filter that is provided for each of the plurality of images and adapted to pass low-frequency components having a frequency lower than a predetermined frequency, in which the determination section determines on a basis of the low-frequency components whether the brightness change is present.

(5)

The image processing device according to (3) or (4) above, in which the synthesis ratio correction section corrects the synthesis ratio by using a subtractor.

(6)

The image processing device according to (3) or (4) above, in which the synthesis ratio correction section corrects the synthesis ratio by using a multiplier.

(7)

The image processing device according to any one of (1) to (6) above, in which the plurality of images each includes a predetermined number of lines that differ from each other in exposure start timing, and the detection section detects presence of edges along the lines as presence of blinking of the light source.

(8)

The image processing device according to (7) above, in which the detection section detects the presence of the edges by using a high-pass filter adapted to pass high-frequency components having a frequency higher than a predetermined frequency.

(9)

The image processing device according to any one of (1) to (8) above, in which the plurality of images includes a first image, a second image, and a third image, the detection section includes:

an early-stage detection section that detects whether the light source has blinked during an exposure period of the second image, and outputs the result of detection as an early-stage detection result; and a late-stage detection section that detects whether the light source has blinked during an exposure period of the third image, and outputs the result of detection as a late-stage detection result;

the synthesis ratio generation section includes:

an early-stage synthesis ratio generation section that, in a case where the early-stage detection result indicates that the light source has blinked, generates a synthesis ratio for making the percentage of the second image lower than the percentage of the first image as an early-stage synthesis ratio, and a late-stage synthesis ratio generation section that, in a case where the late-stage detection result indicates that the light source has blinked, generates a synthesis ratio for making the percentage of the third image lower than the percentage of an early-stage synthesized image as a late-stage synthesis ratio, the early-stage synthesized image being obtained by synthesizing the first image and the second image; and the synthesis section includes:

an early-stage synthesis section that synthesizes the first image and the second image at the early-stage synthesis ratio, and outputs the synthesized image as the early-stage synthesized image, and a late-stage synthesis section that synthesizes the early-stage synthesized image and the third image at the late-stage synthesis ratio.

(10)

The image processing device according to (9) above, further including:

an early-stage determination section that determines whether a brightness change is present between the first image and the second image, and outputs the result of determination as an early-stage determination result; and a late-stage determination section that determines whether a brightness change is present between the early-stage synthesized image and the third image, and outputs the result of determination as a late-stage determination result, in which the early-stage synthesis ratio generation section generates the early-stage synthesis ratio in accordance with the early-stage determination result and the early-stage detection result; and the late-stage synthesis ratio generation section generates the late-stage synthesis ratio in accordance with the late-stage determination result and the late-stage detection result.

(11)

The image processing device according to any one of (1) to (10) above, in which the plurality of images each differs in exposure time.

(12)

An imaging device including:

an imaging section that sequentially acquires a plurality of images captured in chronological order;

a detection section that detects whether a light source has blinked during an exposure period of a detection target image among the plurality of images, and outputs a detection result;

a synthesis ratio generation section that generates, according to the detection result, a synthesis ratio such that an image with blinking of the light source that is among the plurality of images is lower in percentage than an image with no blinking of the light source; and a synthesis section that synthesizes the plurality of images at the synthesis ratio.

(13)

An image processing method including:

a detection step of detecting whether a light source has blinked during an exposure period of a detection target image among a plurality of images captured in chronological order, and outputting a detection result;

a synthesis ratio generation step of, in a case where the detection result indicates that the light source has blinked, generating a synthesis ratio for making the percentage of the detection target image lower than the percentage of an image other than the detection target image; and a synthesis step of synthesizing the plurality of images at the synthesis ratio.

(14)

A program for causing a computer to execute:

a detection step of detecting whether a light source has blinked during an exposure period of a detection target image among a plurality of images captured in chronological order, and outputting a detection result;

a synthesis ratio generation step of, in a case where the detection result indicates that the light source has blinked, generating a synthesis ratio for making the percentage of the detection target image lower than the percentage of an image other than the detection target image; and a synthesis step of synthesizing the plurality of images at the synthesis ratio.

REFERENCE SIGNS LIST

100 Imaging device
110 Optical section
120 DSP circuit
130 Display section
140 Operating section
150 Bus
160 Power supply section
170 Recording section
180 Frame memory
200 Solid-state imaging element
205 Imaging section
210 Scanning circuit
220 Pixel array section
230 Timing control section
240 Column signal processing section
250, 260 Buffer
300 Image processing section
311, 312, 313 Low-pass filter
320 Change determination section
321, 325, 327, 372 Multiplier
322, 331, 371 Subtractor
323 Signal level comparison section
324 Absolute value computation section
326 Threshold value determination section
330, 335 Edge detection section
332 Edge index computation section
336 High-pass filter
340 Synthesis ratio generation section
350 Synthesis ratio calculation section
360 Synthesis ratio modulation section
370 Synthesis ratio correction section
380 Synthesis section
410 Late-stage synthesis ratio computation section
411 Late-stage change determination section
412 Late-stage edge detection section
413 Late-stage synthesis ratio generation section
414 Late-stage synthesis ratio calculation section
415 Late-stage synthesis ratio modulation section
416 Late-stage synthesis ratio correction section
420 Early-stage synthesis ratio computation section
421 Early-stage change determination section
422 Early-stage edge detection section
423 Early-stage synthesis ratio generation section
424 Early-stage synthesis ratio calculation section
425 Early-stage synthesis ratio modulation section
426 Early-stage synthesis ratio correction section
427 Early-stage low-frequency component synthesis section
430 Early-stage synthesis section
440 Late-stage synthesis section
12031 Imaging section

The invention claimed is:

1. An image processing device, comprising:
circuitry configured to:
detect whether a light source has blinked during an exposure period of a detection target image among a plurality of images captured in chronological order;
output a detection result based on the detection that the light source has blinked;
generate a synthesis ratio based on the detection result;
determine whether a brightness change is present between the plurality of images;
output a determination result based on the determination that the brightness change is present between the plurality of images;
modulate the synthesis ratio based on the determination result;
correct the modulated synthesis ratio so as to make a percentage of the detection target image lower than a percentage of an image other than the detection target image among the plurality of images; and
synthesize the plurality of images at the corrected synthesis ratio.

2. The image processing device according to claim 1, further comprising:
a low-pass filter for each of the plurality of images, wherein
the low-pass filter is adapted to pass low-frequency components having a frequency lower than a threshold frequency, and the circuitry is further configured to determine whether the brightness change is present based on the low-frequency components.

3. The image processing device according to claim 1, wherein the circuitry is further configured to correct the synthesis ratio by a subtractor.

4. The image processing device according to claim 1, wherein the circuitry is further configured to correct the synthesis ratio by a multiplier.

5. The image processing device according to claim 1, wherein
each of the plurality of images includes a number of lines that differ from each other in exposure start timing, and
the circuitry is further configured to detect presence of edges along the number of lines as presence of blinking of the light source.

6. The image processing device according to claim 5, wherein the circuitry is further configured to detect the presence of the edges by a high-pass filter adapted to pass high-frequency components having a frequency higher than a threshold frequency.

7. The image processing device according to claim 1, wherein
the plurality of images includes a first image, a second image, and a third image,
the circuitry is further configured to:
detect whether the light source has blinked during an exposure period of the second image;
output an early-stage detection result based on the detection that the light source has blinked during the exposure period of the second image;
detect whether the light source has blinked during an exposure period of the third image;
output a late-stage detection result based on the detection that the light source has blinked during the exposure period of the third image;
generate, as an early-stage synthesis ratio, the synthesis ratio to make a percentage of the second image lower than a percentage of the first image, based on the early-stage detection result;
generate, as a late-stage synthesis ratio, the synthesis ratio to make a percentage of the third image lower than a percentage of an early-stage synthesized image, based on the late-stage detection result, wherein
the early-stage synthesized image is obtained by synthesis of the first image and the second image;
synthesize the first image and the second image at the early-stage synthesis ratio;
output the synthesized first image and the synthesized second image as the early-stage synthesized image; and
synthesize the early-stage synthesized image and the third image at the late-stage synthesis ratio.

8. The image processing device according to claim 7, wherein the circuitry is further configured to:
determine whether the brightness change is present between the first image and the second image;
output an early-stage determination result based on the determination whether the brightness change is present between the first image and the second image;
determine whether the brightness change is present between the early-stage synthesized image and the third image;
output a late-stage determination result based on the determination that the brightness change is present between the early-stage synthesized image and the third image;
generate the early-stage synthesis ratio based on the early-stage determination result and the early-stage detection result; and
generate the late-stage synthesis ratio based on the late-stage determination result and the late-stage detection result.

9. The image processing device according to claim 1, wherein each of the plurality of images differs in exposure time.

10. An imaging device, comprising:
an imaging apparatus configured to sequentially acquire a plurality of images captured in chronological order; and
circuitry configured to:
detect whether a light source has blinked during an exposure period of a detection target image among the plurality of images;
output a detection result based on the detection that the light source has blinked;
generate a synthesis ratio based on the detection result;
determine whether a brightness change is present between the plurality of images;
output a determination result based on the determination that the brightness change is present between the plurality of images;
modulate the synthesis ratio based on the determination result;
correct the modulated synthesis ratio so as to make a percentage of the detection target image lower than a percentage of an image other than the detection target image among the plurality of images; and
synthesize the plurality of images at the corrected synthesis ratio.

11. An image processing method, comprising:
detecting whether a light source has blinked during an exposure period of a detection target image among a plurality of images captured in chronological order;
outputting a detection result based on the detection that the light source has blinked;
generating a synthesis ratio based on the detection result;
determining whether a brightness change is present between the plurality of images;
output a determination result based on the determination that the brightness change is present between the plurality of images;
modulating the synthesis ratio based on the determination result;
correcting the modulated synthesis ratio so as to make a percentage of the detection target image lower than a percentage of an image other than the detection target image among the plurality of images; and
synthesizing the plurality of images at the corrected synthesis ratio.

12. A non-transitory computer-readable medium having stored thereon computer-executable instructions that, when executed by a computer, cause the computer to execute operations, the operations comprising:
detecting whether a light source has blinked during an exposure period of a detection target image among a plurality of images captured in chronological order
outputting a detection result based on the detection that the light source has blinked;
generating a synthesis ratio based on the detection result;
determining whether a brightness change is present between the plurality of images;
outputting a determination result based on the determination that the brightness change is present between the plurality of images;
modulating the synthesis ratio based on the determination result;
correcting the modulated synthesis ratio so as to make a percentage of the detection target image lower than a percentage of an image other than the detection target image among the plurality of images; and
synthesizing the plurality of images at the corrected synthesis ratio.

* * * * *